United States Patent
Furuichi

(10) Patent No.: US 11,451,969 B2
(45) Date of Patent: Sep. 20, 2022

(54) COMMUNICATION CONTROL DEVICE AND COMMUNICATION CONTROL METHOD

(71) Applicant: Sony Corporation, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 95 days.

(21) Appl. No.: 16/980,443

(22) PCT Filed: Jan. 16, 2019

(86) PCT No.: PCT/JP2019/001008
§ 371 (c)(1),
(2) Date: Sep. 14, 2020

(87) PCT Pub. No.: WO2019/187507
PCT Pub. Date: Oct. 3, 2019

(65) Prior Publication Data
US 2021/0022011 A1    Jan. 21, 2021

(30) Foreign Application Priority Data
Mar. 26, 2018    (JP) .............................. JP2018-058557

(51) Int. Cl.
| H04W 16/14 | (2009.01) |
| H04W 52/30 | (2009.01) |
| H04W 72/04 | (2009.01) |

(52) U.S. Cl.
CPC .......... *H04W 16/14* (2013.01); *H04W 52/30* (2013.01); *H04W 72/0453* (2013.01)

(58) Field of Classification Search
None
See application file for complete search history.

(56) References Cited

U.S. PATENT DOCUMENTS

| 2010/0062785 A1* | 3/2010 | Hwang ................. | H04W 16/14 |
| | | | 455/452.1 |
| 2011/0009136 A1* | 1/2011 | Mantravadi ........... | H04W 88/06 |
| | | | 455/501 |

(Continued)

FOREIGN PATENT DOCUMENTS

| JP | 2012-060455 A | 3/2012 |
| JP | 2017-063404 A | 3/2017 |
| JP | 2017-076987 A | 4/2017 |

OTHER PUBLICATIONS

International Search Report and Written Opinion dated Feb. 12, 2019 for PCT/JP2019/001008 filed on Jan. 16, 2019, 8 pages including English Translation of the International Search Report.

*Primary Examiner* — Nicholas Sloms
(74) *Attorney, Agent, or Firm* — Xsensus LLP

(57) ABSTRACT

Provided is a communication control device for managing secondary use of wireless resources.
The communication control device includes an acquisition section that acquires, from the second wireless system, desired communication parameter information regarding secondary use, a setting section that sets a tentative communication parameter for the second wireless system on the basis of the desired communication parameter information, a determination section that determines, by using a protection criterion for the first wireless system, whether or not the tentative communication parameter set by the setting section satisfies a prescribed requirement regarding the first wireless system, and a reporting section that, in a case where the determination section determines that the prescribed requirement is satisfied, reports a permission communication parameter based on the tentative communication parameter to the second wireless system.

2 Claims, 23 Drawing Sheets

(56) References Cited

U.S. PATENT DOCUMENTS

| | | | |
|---|---|---|---|
| 2012/0106461 A1* | 5/2012 | Kasslin | H04W 16/14 370/329 |
| 2013/0157706 A1* | 6/2013 | Jo | H04W 16/14 455/512 |
| 2013/0295948 A1* | 11/2013 | Ye | H04W 16/14 455/452.1 |
| 2014/0016578 A1* | 1/2014 | Lee | H04W 72/10 370/329 |
| 2014/0018117 A1* | 1/2014 | Kang | H04W 24/02 455/501 |
| 2014/0080530 A1* | 3/2014 | Lee | H04W 16/14 455/509 |
| 2014/0248916 A1 | 9/2014 | Nakamura | |
| 2015/0334599 A1* | 11/2015 | Maaref | H04L 47/263 370/236 |
| 2015/0382199 A1* | 12/2015 | Sun | H04W 16/10 455/447 |
| 2016/0006522 A1* | 1/2016 | Furuichi | H04W 72/0453 370/329 |
| 2016/0128000 A1* | 5/2016 | Furuichi | H04W 52/143 370/329 |
| 2016/0143074 A1* | 5/2016 | Wietfeldt | H04B 15/00 370/329 |
| 2017/0280463 A1* | 9/2017 | Learned | H04L 27/0006 |
| 2017/0374558 A1 | 12/2017 | Zhao et al. | |
| 2018/0234974 A1* | 8/2018 | Ngo | H04W 16/14 |
| 2018/0288765 A1* | 10/2018 | Chrisikos | H04W 36/14 |
| 2019/0075595 A1* | 3/2019 | Xue | H04L 1/0026 |
| 2019/0349426 A1* | 11/2019 | Smith | H04W 4/08 |

* cited by examiner

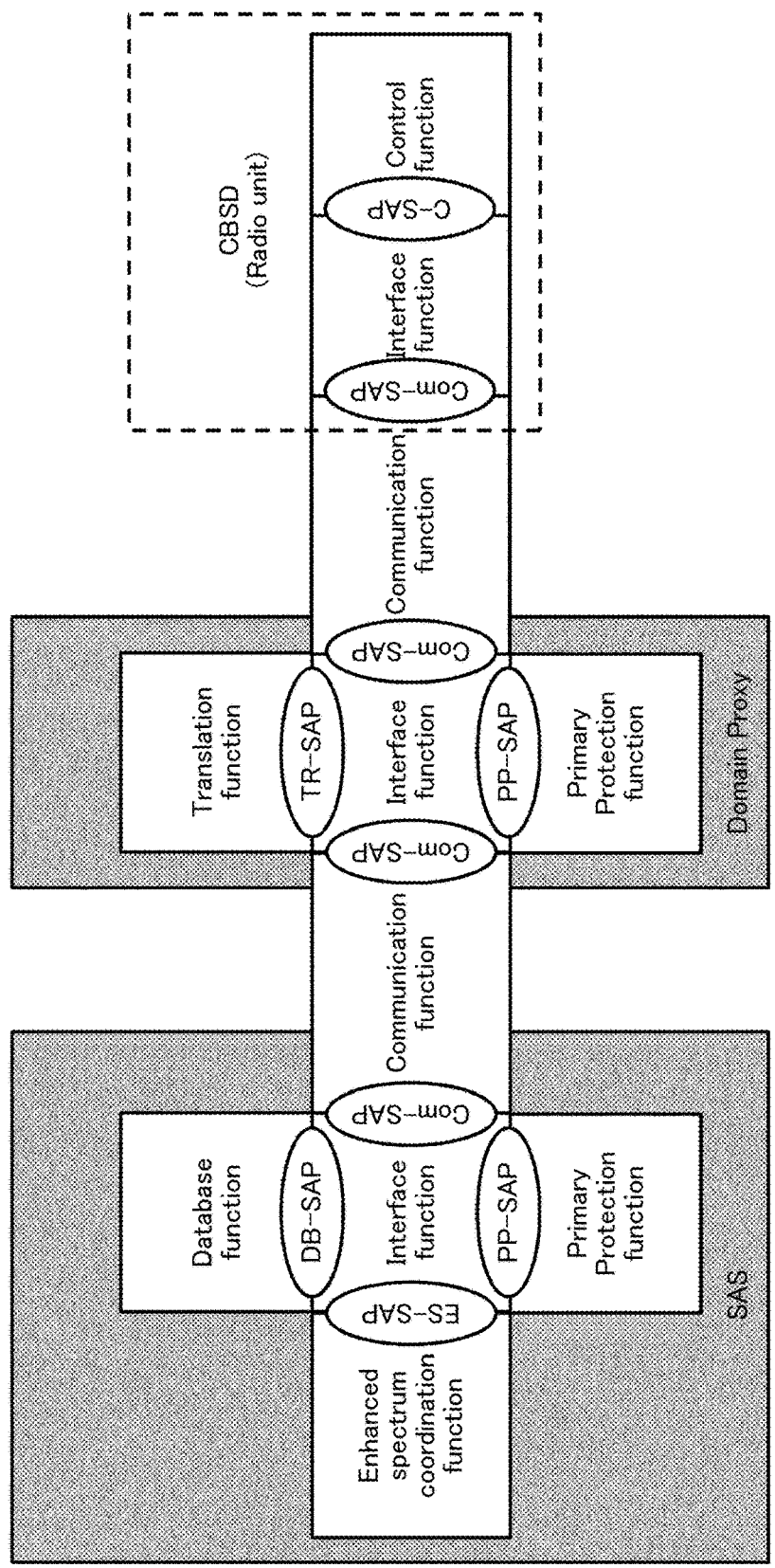
F I G . 1 3

FIG.28
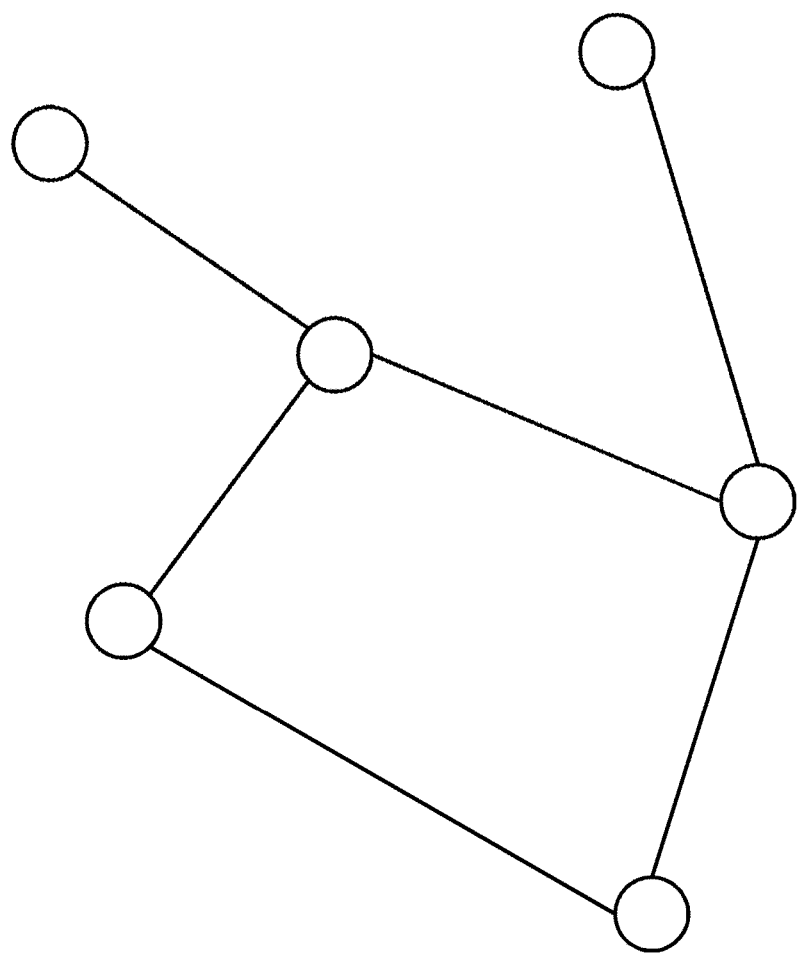
 Vertex (CORRESPONDING TO COMMUNICATION NODE)
 Edge (LINE CONNECTING COMMUNICATION NODES THAT MUTUALLY INTERFERE WITH EACH OTHER)

○ COMMUNICATION NODE BEING MANAGED
BY COMMUNICATION CONTROL DEVICE 1

△ COMMUNICATION NODE BEING MANAGED
BY COMMUNICATION CONTROL DEVICE 2

- - - - Edge WITH RESPECT TO COMMUNICATION NODE BEING
MANAGED BY COMMUNICATION CONTROL DEVICE 2

COMMUNICATION CONTROL DEVICE AND COMMUNICATION CONTROL METHOD

CROSS-REFERENCE TO RELATED APPLICATIONS

The present application is based on PCT filing PCT/JP2019/001008, filed Jan. 16, 2019, which claims priority to JP 2018-058557, filed Mar. 26, 2018, the entire contents of each are incorporated herein by reference.

TECHNICAL FIELD

A technique disclosed herein relates to a communication control device and a communication control method for managing secondary use of some or all of resources being used by a first wireless system.

BACKGROUND ART

Various wireless systems coexist in the recent radio wave environment, and the amount of content using radio waves is increasing and diversifying. These circumstances reveal the problem of shortage of radio resources (frequencies) that can be allocated to wireless systems. However, it has turned out that newly allocating a radio resource is difficult because all of the radio wave bands are used by incumbent wireless systems. To this end, in order to provide necessary radio resources, utilization (Dynamic Spectrum Access (DSA)) of temporal and spatial idle radio waves (White Space) for incumbent wireless systems by use of a cognitive radio technology has been demanded.

In the United States, legislation for Citizens Broadband Radio Service (CBRS), which utilizes a spectrum sharing technology, and standardization of CBRS are being promoted in order to open the Federal use band (3.55 to 3.70 GHz), which overlaps spectrum bands that are internationally defined as 3GPP bands 42 and 43, to the public.

A cognitive radio technology makes contributions not only to dynamic spectrum access but also to enhancement of the spectrum utilization efficiency of a wireless system. For example, ETSI EN 303 387 and IEEE 802.19.1-2014 each define a technology concerning coexistence of wireless systems using White Spaces.

CITATION LIST

Patent Literature

[PTL 1]
Japanese Patent Laid-Open No. 2016-123110

Non-Patent Literature

[NPL 1]
CBRSA-TS-2001 V1.0.0 CBRS Alliance Technical Specification
[NPL 2]
WINNF-SSC-0008-V1.0.0 Spectrum Sharing Committee Policy and Procedure Coordinated Periodic Activities Policy, Wireless Innovation Forum
[NPL 3]
WINNF-TS-0016-V1.2.1 Signaling Protocols and Procedures for Citizens Broadband Radio Service (CBRS); Spectrum Access System (SAS)-Citizens Broadband Radio Service Device (CBSD) Interface Technical Specification
[NPL 4]
WINNF-TS-0096-V1.2.0 Signaling Protocols and Procedures for Citizens Broadband Radio Service (DBRS): Spectrum Access Systems (SAS)-SAS Interface Technical Specifications
[NPL 5]
IEEE Std 802.19.1a-2017
[NPL 6]
WINNF-TS-0112-V1.4.1 Requirements for Commercial Operation in the U.S. 3550-3700 MHz Citizens Broadband Radio Service Band

SUMMARY

Technical Problem

An object of the technique disclosed herein is to provide a communication control device and a communication control method for managing secondary use of some or all of resources being used by a first wireless system.

Solution to Problem

A first aspect of the technique disclosed herein is a communication control device for managing a second wireless system that secondarily uses some or all of frequencies being used by a first wireless system. The communication control device includes an acquisition section that acquires, from the second wireless system, desired communication parameter information regarding secondary use, a setting section that sets a tentative communication parameter for the second wireless system on the basis of the desired communication parameter information, a determination section that determines, by using a protection criterion for the first wireless system, whether or not the tentative communication parameter set by the setting section satisfies a prescribed requirement regarding the first wireless system, and a reporting section that, in a case where the determination section determines that the prescribed requirement is satisfied, reports a permission communication parameter based on the tentative communication parameter to the second wireless system.

The acquisition section acquires the desired communication parameter information that is based on either a first type to include information regarding a maximum transmission power and a frequency that are desired by the second wireless system or a second type to include a requirement regarding a communication parameter for the second wireless system. The requirement regarding the communication parameter for the second wireless system includes at least one of a bandwidth or a transmission power range.

In a case where the acquisition section acquires the desired communication parameter based on the first type, the setting section sets, as tentative communication parameters for the second wireless system, maximum transmission power and frequency indicated by the desired communication parameter information. Alternatively, in a case where the acquisition section acquires the desired communication parameter based on the second type, the setting section sets a tentative communication parameter for the second wireless system while considering the desired communication parameter information and mutual interference with one or more other second wireless systems.

Further, a second aspect of the technique disclosed herein is a communication control method for managing a second wireless system that secondarily uses some or all of frequencies being used by a first wireless system, the communication control method including an acquisition step of acquiring, from the second wireless system, desired communication parameter information regarding secondary use based on a first type or a second type, a setting step of setting a tentative communication parameter for the second wireless system on the basis of the desired communication parameter information, a determination step of determining, by using a protection criterion for the first wireless system, whether or not the tentative communication parameter set at the setting step satisfies a prescribed requirement regarding the first wireless system, and a reporting step of, in a case where satisfaction of the prescribed requirement is determined at the determination step, reporting the tentative communication parameter to the second wireless system.

Advantageous Effects of Invention

The technique disclosed herein can provide a communication control device and a communication control method for managing secondary use of some or all of resources being used by a first wireless system, through effective installment of functions for controlling interference among communication nodes.

It is to be noted that the effects described herein are just examples, and thus, the effects provided by the present invention are not limited to those. In addition, the present invention may further provide additional effects.

Other objects, features, and advantages of the technique disclosed herein will become apparent from the detailed description based on embodiments and attached drawings which are described later.

BRIEF DESCRIPTION OF DRAWINGS

FIG. 13 is a diagram depicting an example of mounting a Domain Proxy interposed between an SAS and a CBSD in a communication system.

FIG. 28 is a diagram depicting one example of an Interference Graph.

DESCRIPTION OF EMBODIMENTS

Figure 1:
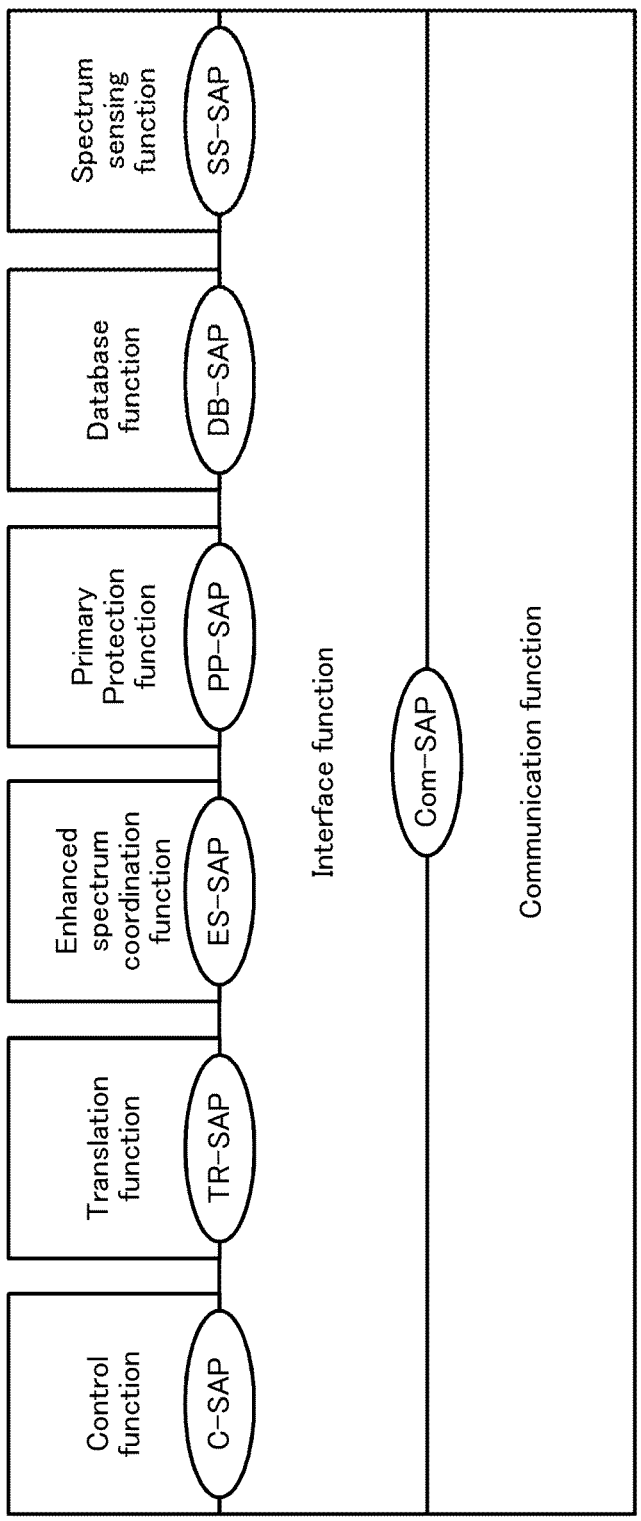
FIG. 1 is a diagram schematically depicting a system reference model for implementing coexistence of wireless systems.

Hereinafter, embodiments of the technique disclosed herein will be explained in detail with reference to the drawings.

To perform spectrum sharing, coexistence of wireless systems using different Radio Access Technologies (RAT) in the same frequency channel or adjacent frequency channels needs to be taken into consideration. For example, in the CBRS band, operations of TDD-LTE and LBT (Listen-Before-Talk)-LTE are expected, and further, 5GNR (New Radio) will be operated in the future.

When necessary radio resources from among radio resources already allocated to a primary system are provided to a secondary system, the primary system needs to be prevented from suffering from interference from the secondary system, that is, the primary system needs to be protected. For example, a communication device has been proposed in which, while a load of calculating a transmission power of a secondary system during operation of the secondary system is suppressed, harmful interference on a primary system is prevented (for example, see PTL 1).

The CBRS Alliance, which is an organization to attain the purpose of promoting commercial use of LTE in the CBRS frequency band, has prescribed a method for implementing coexistence of wireless systems by a logical entity called CxM (Coexistence Manager) allocating channels to wireless devices with use of a graph theory in association with an SAS (Spectrum Access System) (for example, see NPL 1). Meanwhile, a document regarding the policy (see NPL 2) published by the Wireless Innovation Forum (WINNF) discloses that an agreement to carry out information exchange among plural SASs and to execute calculation regarding protection of primary systems once in 24 hours was made.

It can reasonably be expected that an SAS which is prescribed by the WINNF standard (see NPL 2, etc.) is equipped with a CxM (see NPL 1) which is prescribed by the CBRS alliance. Various documents regarding radio wave techniques for implementing coexistence of wireless systems have been published, but any method for organically combining the techniques disclosed in the various documents and properly operating these techniques has not been published. To operate a technology concerning coexistence of wireless systems, the technique needs to conform, in particular, the architectures and procedures specified by other specifications disclosed by the WINNF.

Above all, the WINNF standard (see NPL 6), which has been issued and which prescribes that, in primary system protection calculation, calculation of interference should be conducted on the basis of request parameters (power, frequency) for a communication device is provided. However, it can reasonably be anticipated that a method in which no request parameter is provided from a communication device (for example, only a requirement for a communication parameter is provided) will be adopted in the future.

To this end, in order to simultaneously achieve the specifications prescribed by, in particular, the CBRS alliance (see NPL 1) and the WINNF standard (see NPL 2, etc.) without greatly changing the existing specifications regarding the technology concerning coexistence of wireless systems, a technique for preliminarily adjusting a communication parameter for a communication device by means of a CxM and executing primary system protection calculation based on the adjusted communication parameter will be proposed below.

A. System Model
A-1. System Reference Model

FIG. 1 schematically depicts a system reference model for implementing coexistence of wireless systems, which is assumed in the present specification. In the present specification, 8 logical functions depicted in FIG. 1 are defined. In addition, two more functions are included as general functions. However, a logical function other than the depicted functions may be included, if needed. Hereinafter, these logical functions will be explained.

A-1-1. Database Function

Figure 2:
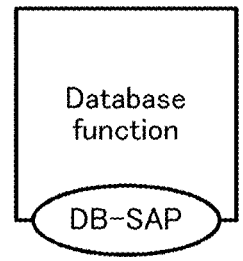
FIG. 2 is a diagram depicting a reference model of a Database function.

FIG. 2 depicts a reference model of a Database function. The Database function is a software or hardware module that stores communication node registration information and communication parameter information and also stores information necessary to calculate information regarding available frequencies for a communication node. A service access point of the Database function is a database SAP (DB-SAP).

The DB-SAP is used by an Interface function in order to make access to a service, such as registration of a communication node or provision of information regarding a primary system, which is provided by the database.

A-1-2. Primary Protection Function

Figure 3:
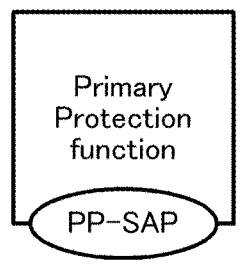
FIG. 3 is a diagram depicting a reference model of a Primary Protection function.

FIG. 3 depicts a reference model of a Primary Protection function. The Primary Protection function is a software or hardware module having a function of calculating frequency information (frequency, maximum allowable transmission power) that can be used by a communication node without hindering radio-wave use by a primary system.

A service access point of the Primary Protection is a Primary Protection SAP (PP-SAP). The PP-SAP is used by the Interface function in order to make an access to a service, such as calculation of available frequency information, which is provided by the Primary Protection function.

In order to implement coexistence of wireless systems, this logical function is not necessarily required. For example, in a case where the technique disclosed herein is applied to a frequency band (e.g. a spectrum that requires no license in the 2.4 GHz band or 5 GHz band) that does not require dynamic protection of incumbent users, protection calculation is unnecessary so that the presence of this logical function is not needed.

A-1-2-1. One Example of Primary Protection Function

Figure 4:
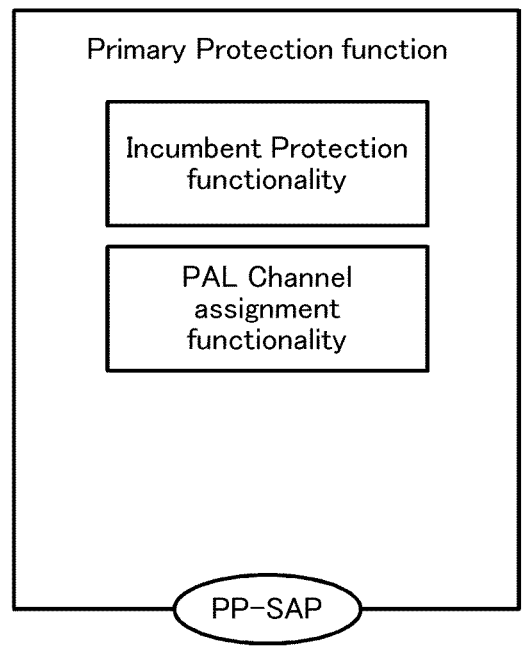
FIG. 4 is a diagram depicting an example in which a Primary Protection function is applied to a mechanism required by FCC rule Part 96 CBRS.

FIG. 4 depicts, as one example of a reference model of a Primary Protection function, an application example to a mechanism required by the rule Part 96 CBRS established by the Federal Communications Commission (FCC). The depicted Primary Protection function includes an Incumbent Protection functionality and a PAL Channel assignment functionality.

The Incumbent Protection functionality is a function of specifying a frequency available to a communication node and calculating a maximum allowable EIRP (Equivalent Isotropic Radiated Power) so as to protect an incumbent system as required by the C.F.R Part 96.

The PAL Channel assignment functionality is a function of allocating a channel to a communication node in the priority access tier (Priority Access Tier) prescribed by the C.F.R Part 96, on the basis of a Priority Access License (PAL), and of carrying out calculation of a PAL Protection Area (PPA).

A-1-3. Enhanced Spectrum Coordination Function

Figure 5:
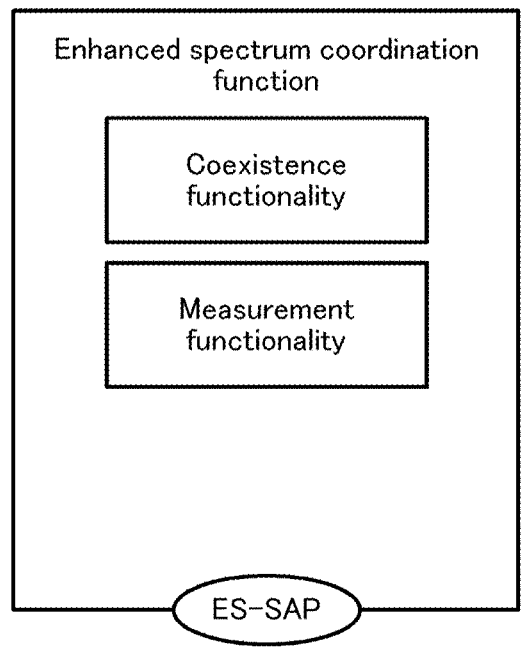
FIG. 5 is a diagram depicting a reference model of an Enhanced Spectrum Coordination function.

FIG. 5 depicts a reference model of an Enhanced Spectrum Coordination function. The Enhanced Spectrum Coordination function is a software or hardware module that adjusts frequency use by a communication node for the purpose of improving the network properties of the communication node. The depicted Enhanced Spectrum Coordination function includes a Coexistence functionality and a Measurement functionality.

The Coexistence functionality is a function of executing adjustment of frequency use by communication nodes for the purpose of reducing or avoiding interference between communication nodes using the same and/or different frequencies and of assisting a cooperation operation between the communication nodes.

The Measurement functionality is a function of collecting information regarding measurement which is executed by a communication node and issuing a measurement command. Measurement information collected by this function may be provided to the Coexistence functionality. Alternatively, determination regarding a command to execute measurement may be made on the basis of a determination made by the Coexistence functionality.

A service access point of the Enhanced Spectrum Coordination function is an Enhanced spectrum coordination SAP (ES-SAP). The ES-SAP is used by the Interface function in order to make an access to a service (functionality), such as coexistence or Measurement, which is provided by the Enhanced Spectrum Coordination function.

A-1-4. Translation Function

Figure 6:
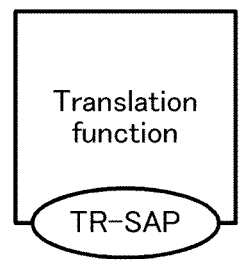
FIG. 6 is a diagram depicting a Translation function.

FIG. 6 depicts a reference model of a Translation function. The Translation function is a software or hardware module that converts the form of signaling to a form recognizable to a partner device for the purpose of reporting a communication node device parameter to a communication control device that is monitoring radio waves of a communication node and of reporting available frequency information to the communication node.

A service access point of the Translation function is a translation SAP (TR-SAP). The TR-SAP is used by an application intended to report and receive information.

A-1-5. Control Function

Figure 7:
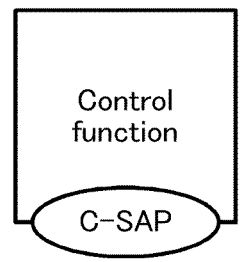
FIG. 7 is a diagram depicting a reference model of a Control function.

FIG. 7 depicts a reference model of a Control function. The Control function is a software or hardware module that transmits auxiliary information to a communication control device via the Translation function, and controls a communication node on the basis of a control result reported from the communication control device.

A service access point of the Control function is a control SAP (C-SAP). The C-SAP is used by an application intended to report information to a communication control device and receive information. A communication node is mainly a Consumer of the Control function. In addition, in order to control a radio function of a communication node, a unique data structure of the Control function and parameters therefor can be defined.

A-1-6. Spectrum Sensing Function

Figure 8:
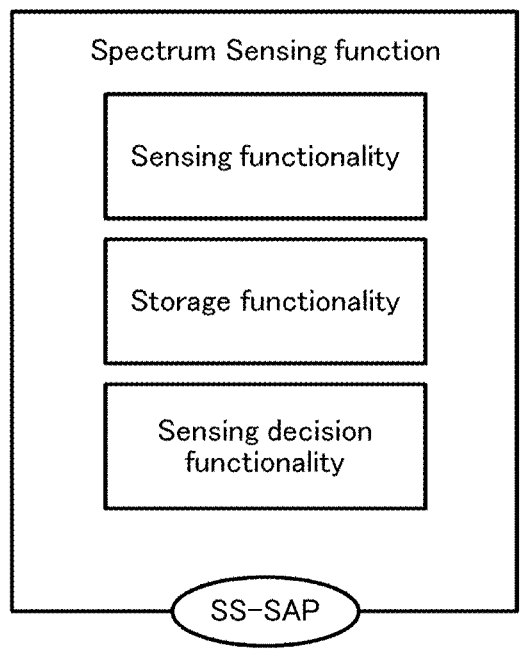
FIG. 8 is a diagram depicting a reference model of a Spectrum sensing function.

FIG. 8 depicts a reference model of a Spectrum sensing function. The Spectrum sensing function is a software or hardware module for sensing the presence of another wireless system (spectrum sharing).

The Spectrum sensing function can include a Sensing functionality, a Storage functionality, and a Sensing decision functionality, as depicted in FIG. 8.

The Sensing functionality is a function of carrying out sensing regarding a signal from another wireless system, and further, is a function of providing sensing data to the Storage functionality and/or the Sensing decision functionality.

The Storage functionality is a function for storing data provided from the Sensing functionality.

The Sensing decision functionality is a function of managing data provided from the Sensing functionality and/or data extracted from the Storage functionality and determining the presence or absence of a signal from another wireless system.

A service access point of the Spectrum sensing function is a Spectrum sensing SAP (SS-SAP). The SS-SAP can be used by a function (e.g. the Primary Protection function) that requires a sensing result.

A-1-7. Communication Function

Figure 9:
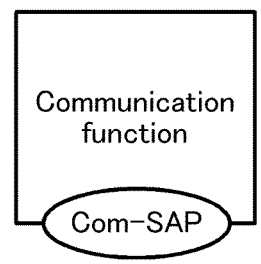
FIG. 9 is a diagram depicting a reference model of a Communication function.

FIG. 9 depicts a reference model of a Communication function. The Communication function is a software or hardware module that provides a communication services that is requested by a communication protocol stack or an interface between logical functions.

A service access point of the Communication function is a communication SAP (Com-SAP). The Com-SAP exchanges, with the Communication function and the Interface function, information such as available frequency information, device parameters, and use frequency information.

A-1-8. Interface Function

Figure 10:
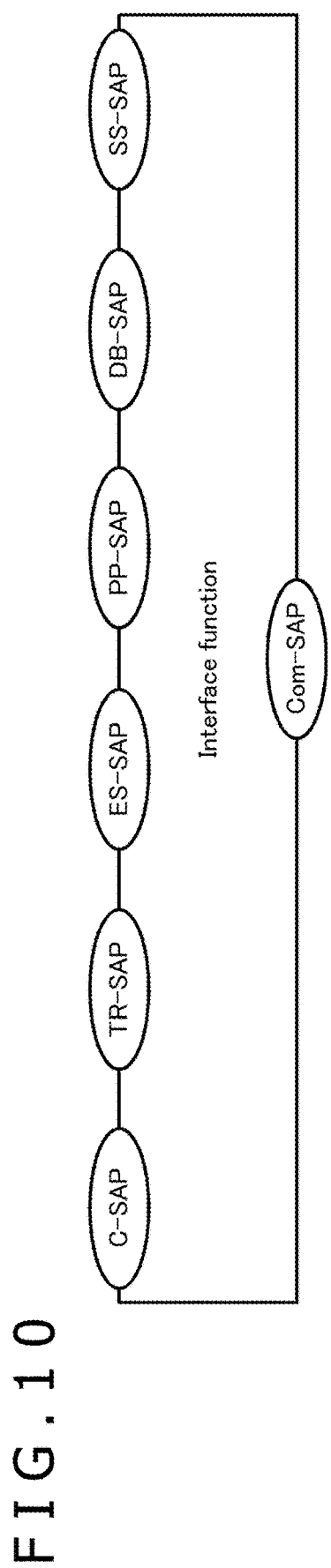
FIG. 10 is a diagram depicting a reference model of an Interface function.

FIG. 10 depicts a reference model of the Interface function. The Interface function is an abstract function that can be implemented by a combination of the abovementioned functional blocks and which is for ensuring the integrity of the physical entities.

Service access points of the Interface function can be all of the abovementioned SAPs.

A-2. Representative System Model

A representative system model for coexistence of wireless systems will be explained with reference to the reference models explained above in A-1.

A-2-1. SAS-CBSD Interface

Figure 11:
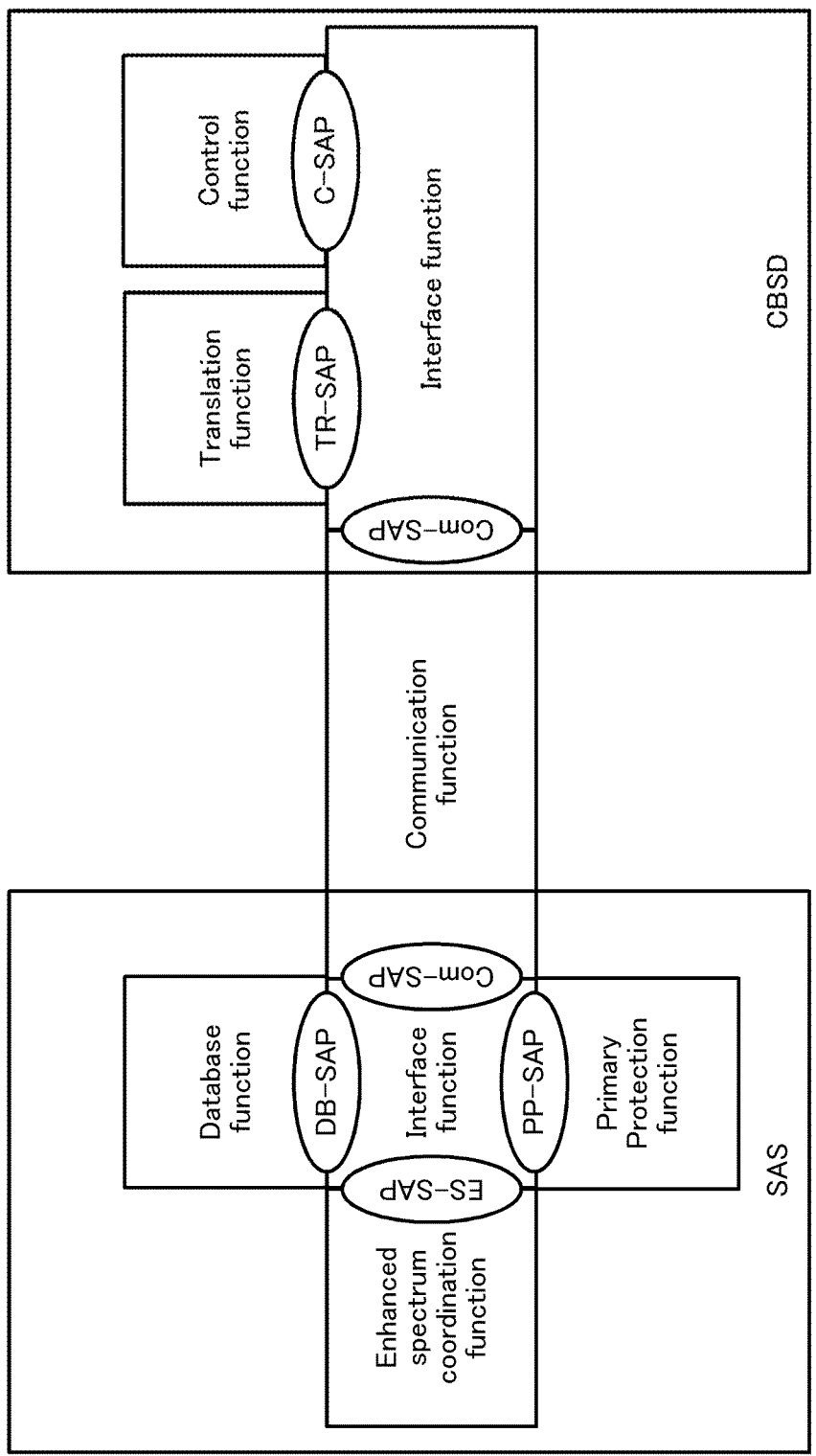
FIG. 11 is a diagram depicting an example of mounting an SAS and a CBSD and respective interfaces thereof.

FIG. 11 depicts an example of mounting an SAS having a Coexixtence function, a CBSD (Citizen Broadband Radio Service Device), and an interface therebetween. In the depicted example, the SAS includes a Database function, a Primary Protection function, and an Enhanced Spectrum Coordination function. Further, the CBSD includes a Translation function and a Control function. For example, the SAS is a communication control device that manages a secondary system which secondarily uses some or all of radio resources being used by a primary system. The CBSD corresponds to a base station (e.g, an eNB or gNB) that issues a request for secondary use of radio resources to a communication control device.

According to SAS-CBSD standard WINNF-TS-0016 prescribed by the WINNF standard (NPL 3), HTTPS (Hypertext Transfer Protocol Secure) communication is required to be performed in mutual signaling between an SAS and a CBSD. Therefore, it can be considered that application layer communication is provided by a Communication function.

A-2-2. SAS-SAS Interface

Figure 12:
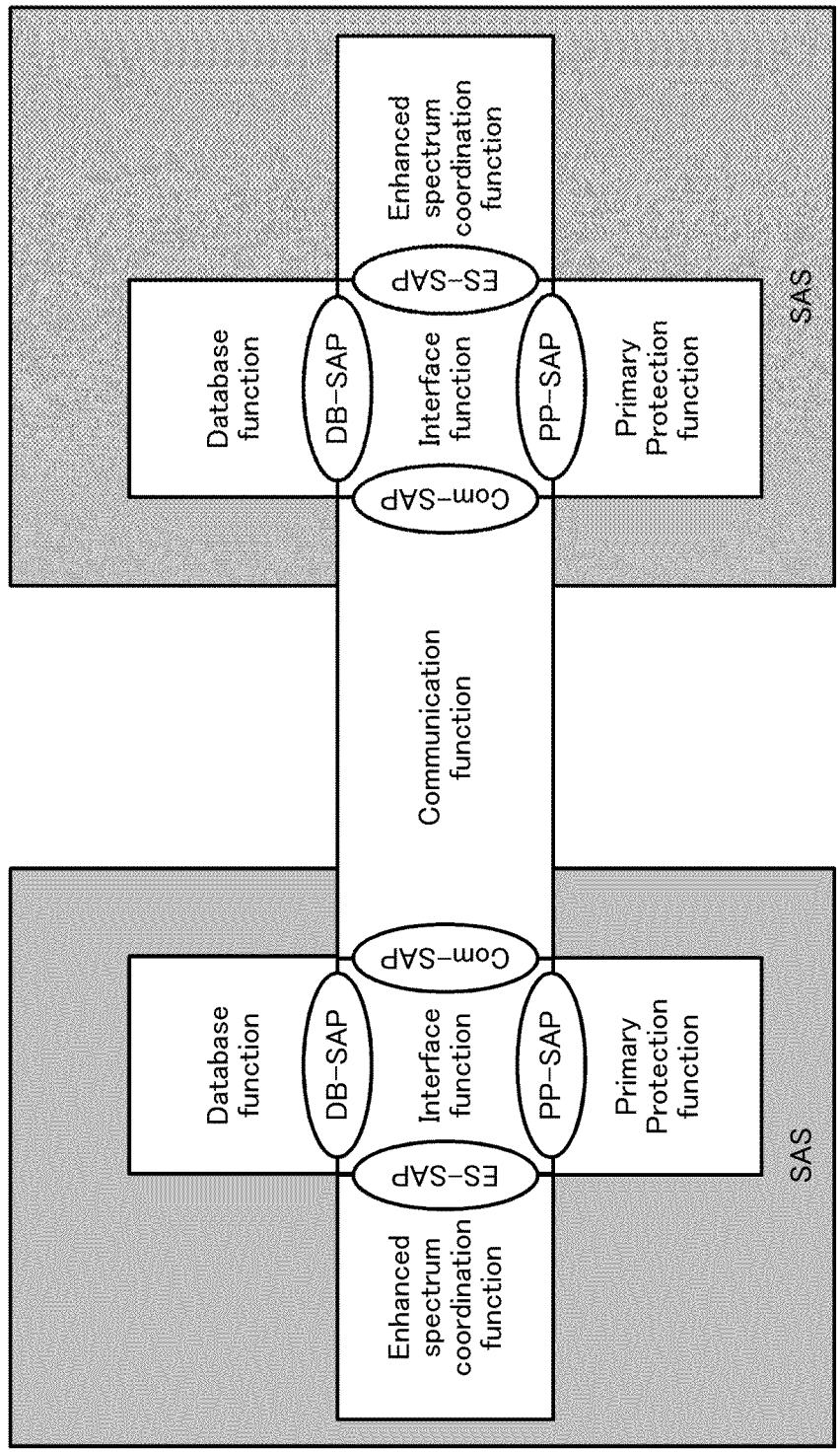
FIG. 12 is a diagram depicting an example of mounting interfaces between SASs.

FIG. 12 depicts an example of mounting an interface between SASs each having the Coexistence function. In the depicted example, the SASs each include the Database function, the Primary Protection function, and the Enhanced Spectrum Coordination function.

A-2-3. SAS-Domain Proxy-CBSD

FIG. 13 depicts an example of mounting an intermediate device called Domain Proxy interposed between an SAS and a CBSD in a communication system. The Domain Proxy can be implemented by a Translation function. In this case, it is desirable that the CBSD has a Radio unit alone (however, the CBSD does not necessarily serve as the Radio Unit).

Here, the Communication function between the SAS and the Domain Proxy provides application layer communication (e.g. HTTPS), as in the case described previously in A-2-1. Meanwhile, layer communication, which is expected in a core network of a cellular system, is assumed as one example for the Communication function between the Domain Proxy and the CBSD (Radio unit). As a result, the layer communication (e.g. HTTPS) may be performed, similarly to communication between the SAS and the Domain Proxy.

A-2-4. SAS-CxM-CBSD

Figure 14:
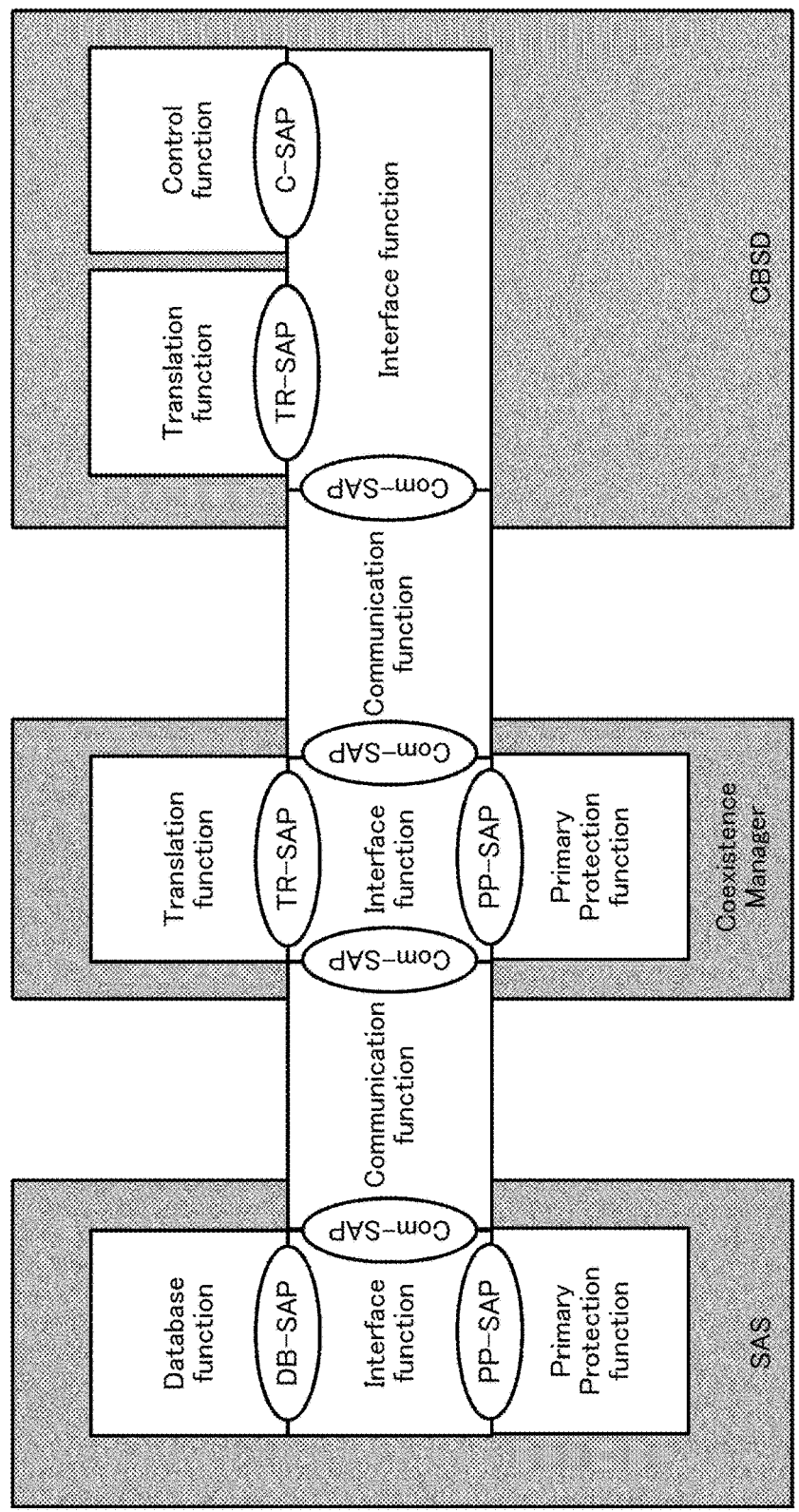
FIG. 14 is a diagram depicting an example of mounting a CxM interposed between an SAS and a CBSD in a communication system.

FIG. 14 depicts an example of mounting an intermediate device called Coexistent Manager (CxM), which provides a Coexistence service, interposed between an SAS and a CBSD in a communication system. As one example of this CxM, a CxM disclosed in NPL 1 is assumed.

A-2-5. CxM-CxM Interface

Figure 15:
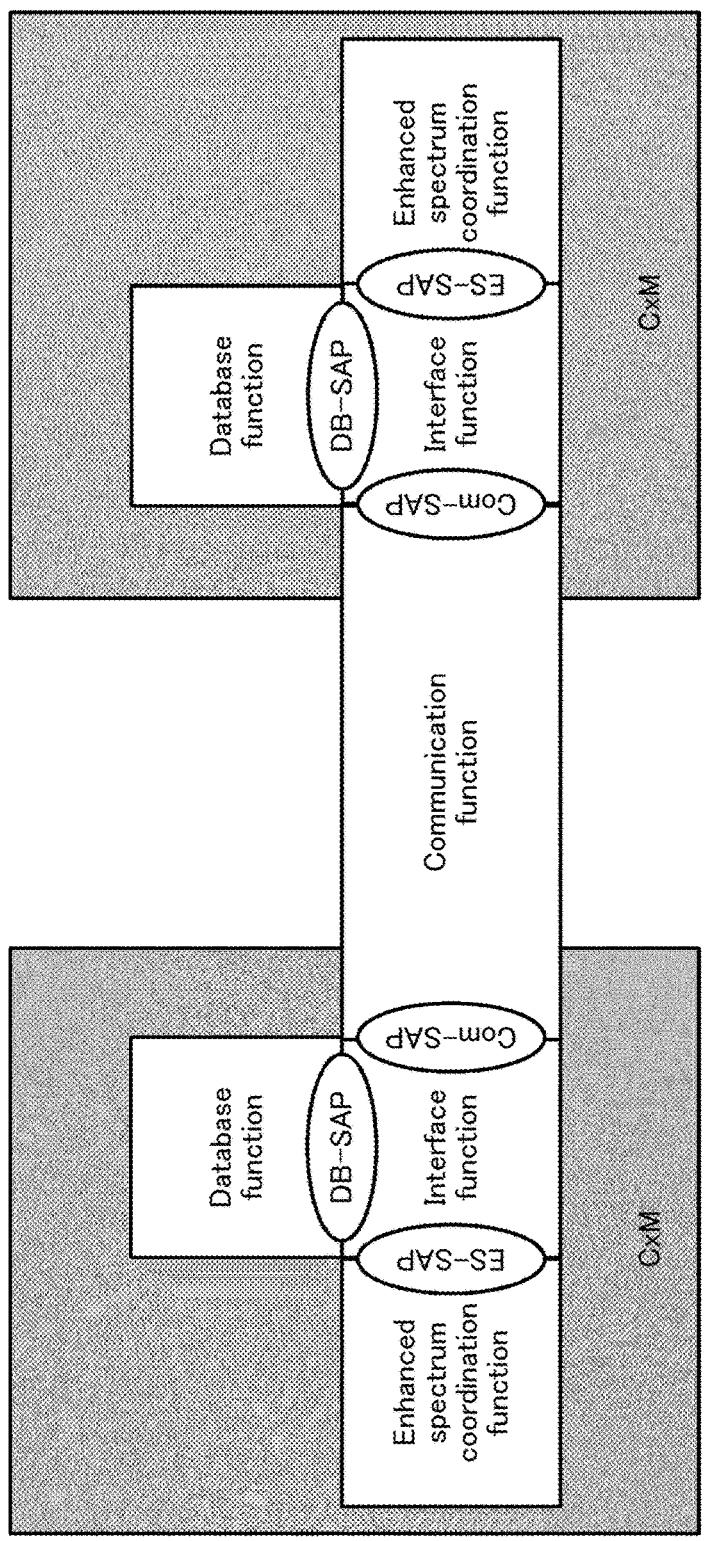
FIG. 15 is a diagram depicting one example of an interface between different CxMs.

FIG. 15 depicts one example of an interface between different CXMs, which is not disclosed in NPL 1. As a result, the communication between the CxMs may perform application layer communication (e.g. HTTPS), similarly to the case described previously in A-2-1.

A-3. Other Examples and Supplemental Remarks

A mounting example for achieving coexistence of wireless systems is not limited to the abovementioned mounting examples. It should be fully understood that any embodiment that can be implemented by a combination of the abovementioned functional blocks falls within the application scope of the technique disclosed herein.

A wireless device that can be implemented by a combination of the abovementioned functional blocks typically corresponds to a wireless base station, an access point, or a wireless relay station. The wireless device may be fixed or may be installed in a mobile body such as a vehicle. Further, any wireless access technique can be used. The wireless device can have a coverage size ranging from a large one of a macro cell or the like to a small one of a picocell or the like. Also, in a case where the wireless device has a beam forming capability, a cell or a service area may be formed by each beam.

In a typical case, the wireless device is set and operated by one company or an individual. However, the application scope of the technique disclosed herein is not limited to this case. Alternatively, the wireless device may be a shared facility that is used by a plurality of companies or a plurality of individuals. In a case where the facility is used by a plurality of individuals, setting and operation of the facility may be performed by a third party excluding the users.

A terminal that uses the abovementioned wireless device is typically a communication apparatus such as a smartphone. However, the terminal is not necessarily used by people and may be a network connection apparatus such as a sensor that is installed in a factory machine or in a building. Also, the terminal may be equipped with a relay communication function, as in D2D (Device to Device). In addition, the terminal may be an apparatus called CPE (Customer Premises Equipment), which is used in a wireless backhaul or the like.

In addition, when a secondary system secondarily uses some or all of resources allocated to a primary system, the communication control device determines and designs a communication parameter for a wireless device. The determination and designation can be achieved by a combination of the abovementioned functional blocks. For example, a network manager that integrally controls wireless devices in a network, or a communication control device, represented by a Spectrum Manager or a Coexistence Manager, which is represented in ETSIEN 303 387 or IEEE 802.19.1-2014, for controlling radio-wave interface among the wireless devices is supposed. Further, under a spectrum sharing environment, a database server such as a GLDB (Geolocation database) or an SAS can be also included the communication control device.

There may be a plurality of communication control devices. In this case, the communication control devices exchange, with one another, information regarding wireless devices being managed by the communication control device, so that allocation of necessary frequencies and interference control calculation can be executed. The policy document regarding the WINNF standard, which has already been published, discloses an operation policy defining that information exchange between a plurality of SASs and calculation for primary system protection are executed once in 24 hours (see NPL 2).

The communication control device basically controls wireless devices (wireless base stations, access points, wireless relay stations, etc.), but may control terminals subordinate to the wireless devices.

A-3-1. Spectrum Sharing

Figure 16:
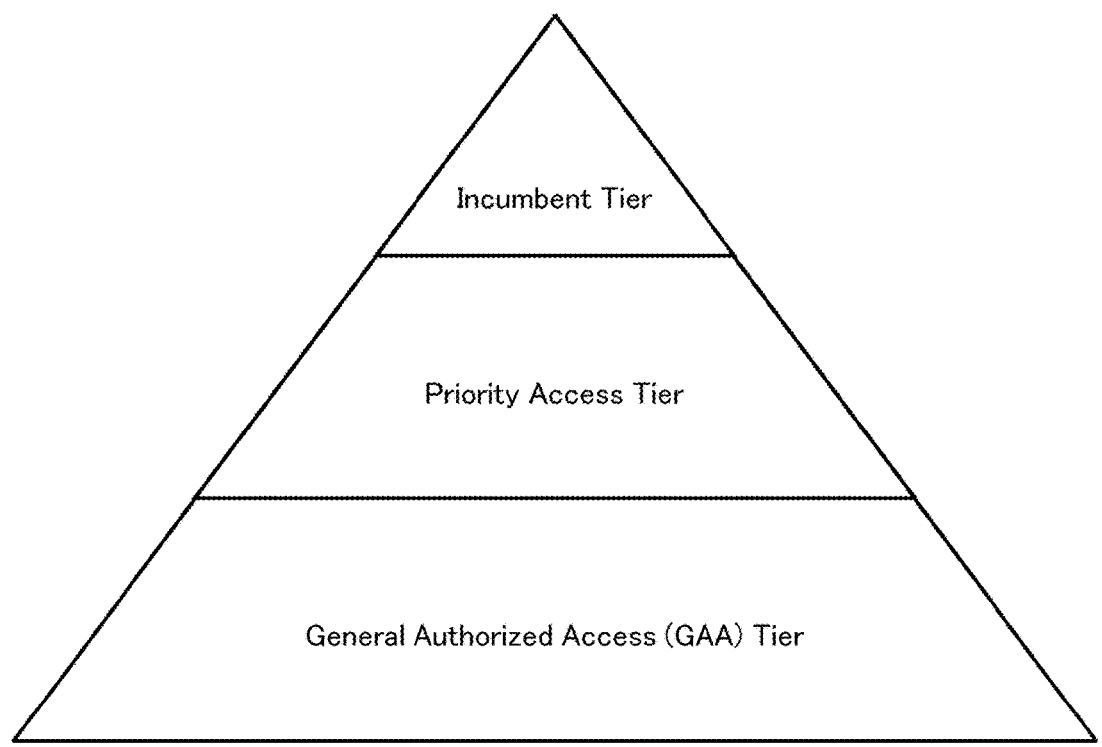
FIG. 16 is a diagram depicting a hierarchical structure regarding use of CBRS for which the FCC has legislated.
Figure 17:
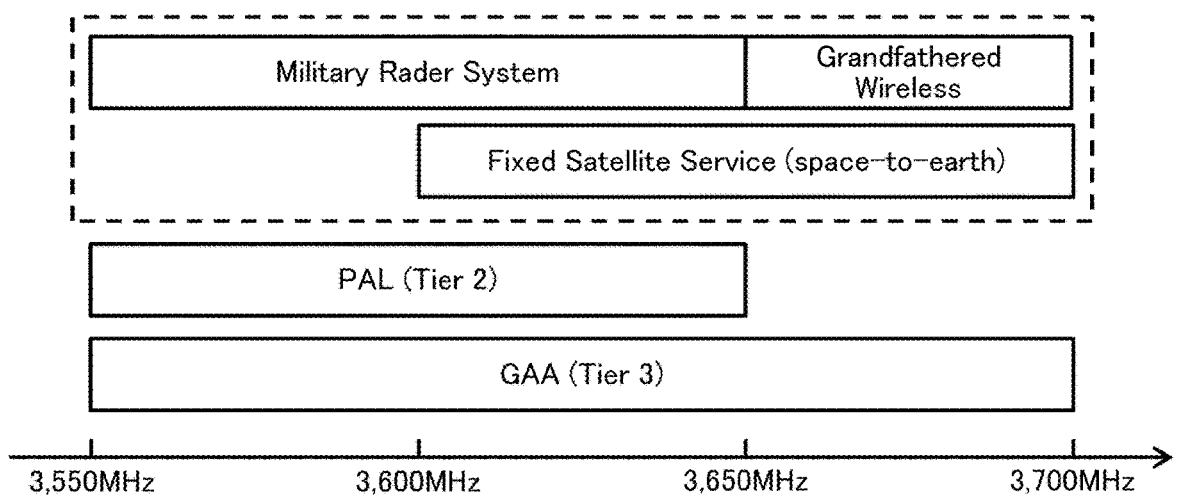
FIG. 17 is a diagram depicting bands that are used by tiers in CBRS.

FIG. 16 depicts, as one example of a spectrum sharing environment, a hierarchy structure regarding use of CBRS for which the FCC has legislated. FIG. 17 depicts bands that are used by tiers in CBRS.

Creation of a framework for opening the 3.5 GHz band, which has been allocated to warship radars and the fixed satellite service of the US Department of Defense, to new public broadband services through dynamic spectrum sharing using a Database function, such as an SAS, has been started.

Users using the 3.5 GHz band are classified into three groups (tiers) called an incumbent tier, a priority access tier, and a general authorized access (GAA) tier, as depicted in FIG. 16. Examples of users of the incumbent tier include a warship radar (Military Radar System), a fixed satellite service (space-to-earth), and a Grandfathered Wireless System (wireless system for exclusion of application). A user of the priority access tier can use a shared region with a license (Priority Access License). In addition, a user of the general authorized access (GAA) tier substantially needs no license.

Regarding use of frequencies, the incumbent tier is a primary system having the highest priority. The primary system is not required to avoid or to refrain from interfering with the remaining wireless systems belonging to the lower priority access tier and the general authorized access tier, and further, is protected against interference from the priority access tier and the general authorized access tier (protection of the primary system).

Each of the priority access tier and the general authorized access tier is a secondary system having lower priority than the primary system. The secondary systems are required to avoid or refrain from interfering with the primary system. In addition, priority levels are also set between the secondary systems, the priority access tier has higher priority by use of a license while the general authorized access tier which requires no license has the lowest priority. The priority access tier is protected against interference from the general authorized access tier, but the general authorized access tier is not protected against interference from the priority access tier.

However, it should be fully understood that, in a case where the technique disclosed herein is implemented, wireless systems to share frequencies are not limited to the abovementioned ones. Any wireless system other than the abovementioned ones may be used as a primary system or a secondary system. Furthermore, it should be fully understood that the technique disclosed herein is applicable to spectrum sharing among a plurality of wireless systems in a frequency band other than the 3.5-Hz band.

In addition, it should be fully understood that the range to which the technique disclosed herein is applicable is not limited to a spectrum sharing environment. In spectrum sharing, an incumbent system using a target band and a secondary user are commonly called primary system and secondary system, respectively. However, in a case where the technique disclosed herein is applied to an environment other than the spectrum sharing environment, the above terms may be replaced with other terms.

For example, a macro cell is defined as a primary system and a small cell or a relay station is defined as a secondary system in a HetNet (Heterogeneous Network), and the technique disclosed herein is applied thereto, whereby coexistence of wireless systems can be preferably implemented.

In addition, a base station is defined as a primary system and a Relay UE or a Vehicle UE for implementing D2D or V2X (Vehicle to Everything) existing in the coverage of the base station is defined as a secondary system, and the technique disclosed herein is applied, whereby coexistence of wireless systems can be preferably implemented. Here, the base station is not limited to a fixed type and may be a portable type or a mobile type.

Furthermore, an interface between entities may be a wired type or may be a wireless type. For example, an interface between a communication control device that manages secondary use of radio resources and a communication device that requests radio resources, a wireless interface independent of spectrum sharing (e.g. a wireless interface provided through a Licensed band by a mobile communication company, or Wi-Fi communication using an existing band that requires no license) may be used.

Moreover, the term "frequency" can be replaced with another term. For example, the term "frequency" can be replaced with any one of "resource," "resource block," "resource element," "channel," "component carrier," "carrier," "sub-carrier," and terms having meanings similar thereto.

B. Procedures for Spectrum Sharing

Next, an explanation will be given of procedures for spectrum sharing, that is, procedures to be used by a primary system for allowing a secondary system to secondarily use some or all of radio resources being used by the primary system. In secondary use of radio resources, the primary system needs to be protected against interference from the secondary system (explained previously).

Hereinafter, it is assumed that a communication control device is configured to manage secondary use, of wireless resources being used by a primary system, by a communication device. It is to be noted that secondary use is defined as a communication service that is carried out by allowing a communication device of a secondary system to use some or all of target regions already allocated to a primary system.

The communication control device is a system corresponding to an SAS equipped with a Database function of storing communication node registration information, communication parameter information, and information that is necessary to calculate available frequency information for the communication node, for example, a Primary Protection function of calculating frequency information (frequency, maximum allowable transmission power) that is available to the communication node without hindering radio-wave use by the primary system, and an Enhanced Spectrum Coordination function of adjusting frequency use by the communication node. The communication control device allocates, to communication devices, radio resources to be secondarily used, while protecting the primary system against interference.

Each of the communication devices is a communication node that corresponds to a wireless base station, an access point, or a wireless relay station belonging to a secondary system, and is equipped, for example, with a Control function of transmitting auxiliary information to the communication control device and controlling a communication node on the basis of the control result reported by the communication control device, and a Translation function of converting signaling for reporting an own communication node device parameter to a format that is recognizable to the communication control device and converting signaling for converting available frequency information from the communication control device to a format that is recognizable to the communication device.

Moreover, the communication control device and the communication device can perform mutual communication by means of the Communication function. For example, see the interface mounting example in FIG. 11.

Figure 18:
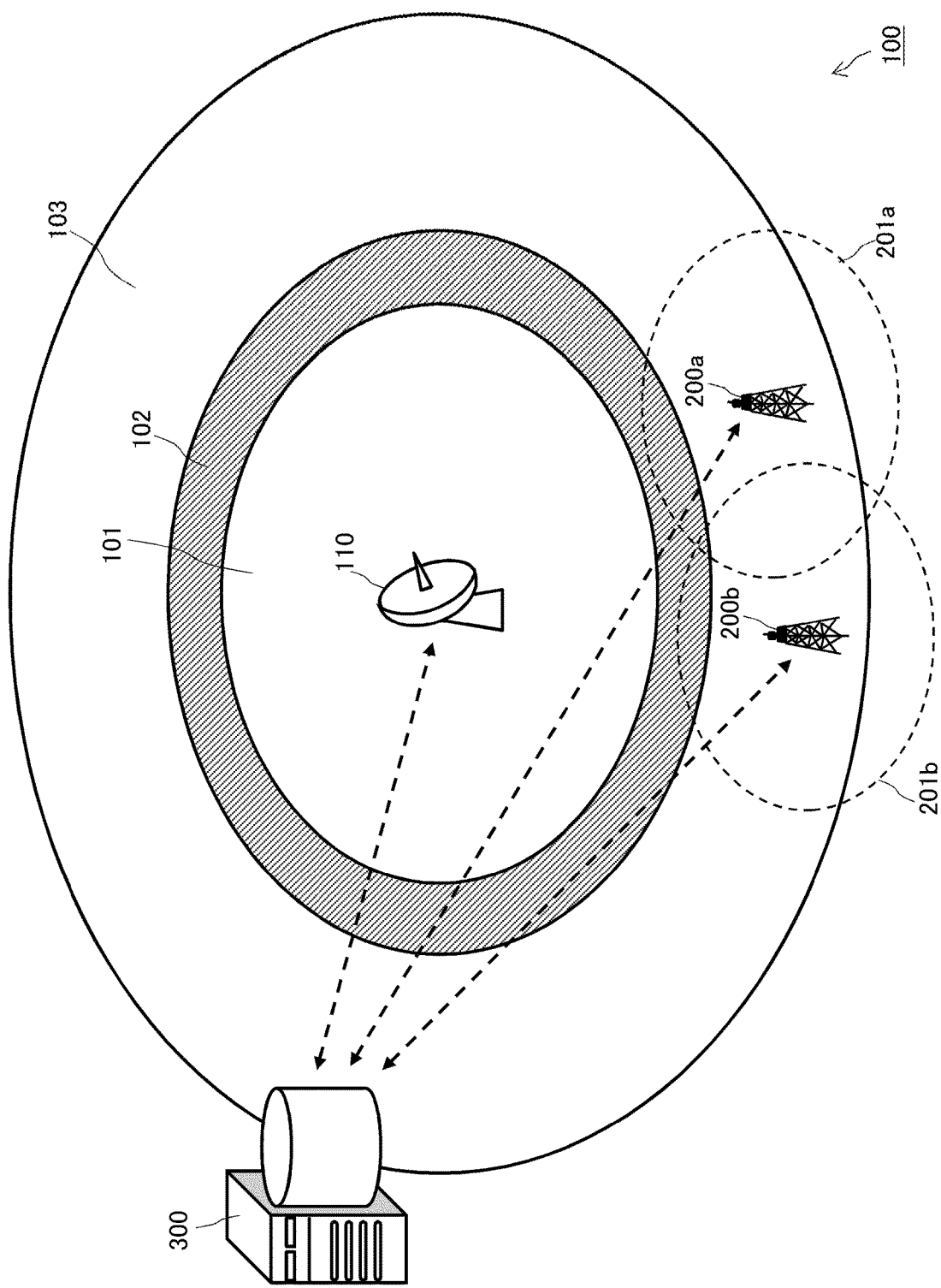
FIG. 18 is a diagram schematically depicting one example of a communication system 100 in which spectrum sharing is performed.

FIG. 18 schematically depicts one example of a communication system 100 that implements spectrum sharing. The illustrated communication system 100 includes a communication node (primary use node) 110 that is a primary system already using a target band (e.g. the 3.5 GHz band), one or more (two in the illustrated example) communication nodes (secondary use nodes) 200a and 200b that, as a secondary system, secondarily use the target band, and a communication control device 300 that manages secondary use of the target band by the communication nodes 200a and 200b.

The communication node 110 is a primary use node that, as the primary system, transmits and receives radio signals by using the target band. However, the communication node 110 is a mobile type such as a warship radar, for example, but may be a fixed type base station.

In FIG. 18, reference numeral 101 denotes a service area in which the communication node 110 can perform communication. Further, a hatched region denoted by a reference numeral 102 is the outer edge of the service area of the communication node 110. As a terminal of the primary system, a communication device (not illustrated) positioned inside the outer edge 102 can transmit/receive radio signals to/from the communication node 110 by using the target band. Further, a region, which is denoted by a reference numeral 103, outside the outer edge 102 is a temporal and spatial idle region (White Space) for the primary system. The outer edge 102 is a buffer area (Guard Area) that is provided between the service area 101 of the communication node 110 and the idle region 103.

As secondary use nodes of the secondary system, the communication nodes 200a and 200b each transmit and receive radio signals by using a radio resource, of the target band, the use of which is permitted by the communication control device 300. The communication nodes 200a and 200b are base stations using a PAL channel or a GAA frequency, for example, but each may be not a fixed type but a portable or mobile type. The communication node 200a and the communication node 200b may be mutually connected via a backbone network (not illustrated) or the like.

The communication control device 300 is connected to the communication node 110 of the primary system and to the communication nodes 200a and 200b of the secondary system over a backbone network (not illustrated) or the like. The communication control device 300 receives information (registration information, positional information, etc.) that is necessary to determine to permit/prohibit the communication nodes 200a and 200b to secondarily use the target band, stores the received information by means of the Database function, and further, determines permission/prohibition of the secondary use by calculating frequency information (frequency, maximum allowable transmission power) that is available to the communication nodes 200a and 200b without hindering the primary system from using radio waves, by means of the Primary Protection function, and reports the result to the communication nodes 200a and 200b.

The determination to be made by the communication control device 300 regarding permission/prohibition of secondary use is assumed to be made in accordance with a prescribed spectrum policy including avoidance or inhibition of interference with the primary system and including protecting a communication node with the higher priority against interference from a communication with the lower priority in a case where there is a difference in priority between the communication nodes 200a and 200b (for example, in a case where the communication node 200a is a PAL and the communication node 200b is a GAA).

In FIG. 18, reference numerals 201a and 201b denote service areas of the communication nodes 200a and 200b, respectively. The service areas 201a and 201b correspond to an area within which the communication nodes 200a and 200b are capable of transmitting and receiving radio signals with the maximum allowable transmission power reported by the communication control device 300.

The communication control device 300 permits secondary use of the communication nodes 200a and 200b present in the idle region 103 while restricting the available frequency information so as to avoid or refrain from interfering with the service area 101 of the communication node 110, whereby the primary system is protected. It is to be noted that, in a case where the target band is secondarily used in the idle region 103, the existence of the guard area 102 reduces a possibility that a failure such as interference with the service area 101 occurs.

In a case where the communication node 110 is a mobile type such as a warship radar, the service area 101, the guard area 102, and the idle region 103 of the communication node 110 move with movement of the communication node 110. At the time point depicted in FIG. 18, the communication nodes 200a and 200b are capable of secondarily using the target band for being present in the idle region 103, and the respective distances from the communication nodes 200a and 200b to the service area 101 of the communication node 110 also vary with time so that at least one of the communication nodes 200a or 200b can enter the service area 110 in a certain time period.

That is, the influence of interference from the communication nodes 200a and 200b of the secondary system on the primary system constantly varies. Thus, the communication control device 300 needs to calculate, in every prescribed time period, frequency information (frequency, maximum allowable transmission power) that is available to the communication nodes 200a and 200b and report the information.

Figure 19:
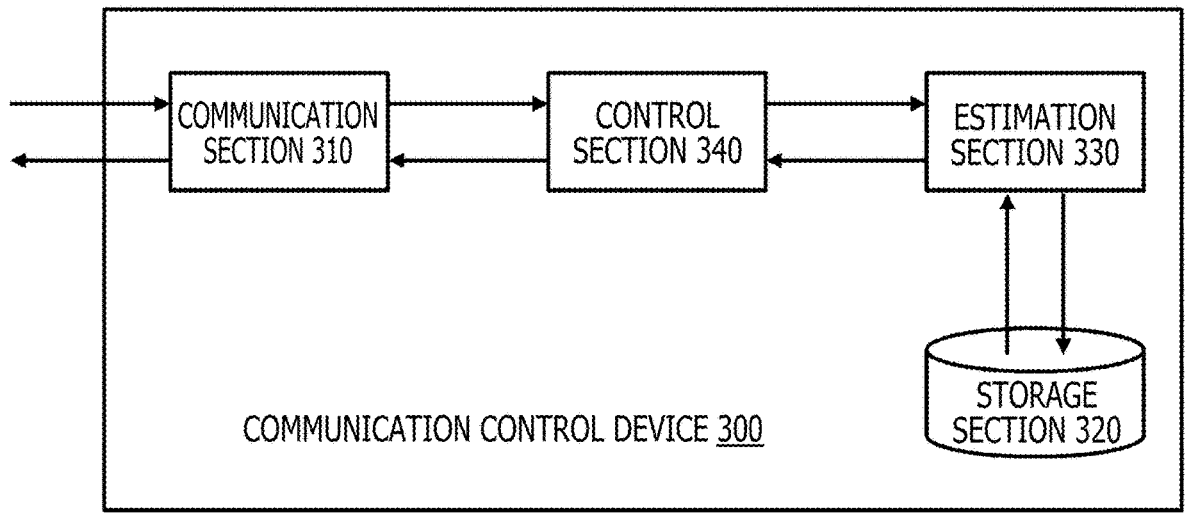
FIG. 19 is a block diagram depicting functional components of a communication control device 300.

FIG. 19 schematically depicts the functional components of the communication control device 300 that manages secondary use of a frequency band being already used by a primary system, by a secondary system. The depicted communication control device 300 includes a communication section 310, a storage section 320, an estimation section 330, and a control section 340. Each of the functional blocks is implemented by a software or hardware module.

The communication section 310 is a communication interface for performing communication with the communication nodes 200a and 200b of the secondary system, and receives, from each of the communication nodes 200a and 200b, a secondary use registration request, an inquiry about available frequency information, a frequency use report (which will be described later), or the like, for example. The communication section 310 is equipped with a Communication function of providing communication services requested to a communication protocol stack and an interface between logical functions and with a Com-SAP which is a service access point of the Communication function (see FIG. 9). In addition, the communication section 310 causes the storage section 320 to store the information received from the communication nodes 200a and 200b.

The storage section 320 includes a storage medium, such as a hard disk or a semiconductor memory, having a relatively large capacity. The storage section 320 is used to store information received from the communication nodes 200a and 200b by the communication section 310. The storage section 320 is equipped with the Database function of storing registration information regarding the communication nodes 200a and 200b and the communication parameter information and storing information that is necessary to calculate frequency information available to the communication nodes 200a and 200b and with a DB-SAP which is a service access point of the Database function (see FIG. 2).

The estimation section 330 calculates frequency information (frequency, maximum allowable transmission power) that is available to each of the communication nodes 200a and 200b, in accordance with a prescribed spectrum policy by using the information regarding the communication nodes 200a and 200b stored in the storage section 320, and estimates the service areas 201a and 201b of the respective communication nodes 200a and 200b. The estimation section 330 is equipped with a Primary Protection function of calculating frequency information that is available to a communication node without inhibiting radio wave use by the primary system and with a PP-SAP which is a service access point of the Primary Protection function.

The control section 340 adjusts the configuration for secondary use between the communication nodes 200a and 200b on the basis of the positional relation between the service areas 201a and 201b in the secondary system estimated by the estimation section 130 and on the basis of a wireless access method available to the communication nodes 200a and 200b, for example. The control section 340 is equipped with an Enhanced Spectrum Coordination function of adjusting frequency use by the communication nodes 200a and 200b (the Coexistence functionality of adjusting frequency use by the communication nodes 200a and 200b in order to reduce or avoid interference between the communication nodes 200a and 200b or to assist cooperative operation between the communication nodes 200a and 200b) and with an ES-SAP which is a service access point of the Enhanced Spectrum Coordination function (see FIG. 5).

It is to be noted that, although the communication control device 300 is depicted as a single device in each of FIGS. 18 and 19, the Database function and the Primary Protection function, for example, may be respectively formed on two devices that are physically separate from each other so as to implement all the functions of the communication control device 300.

The communication control device 300 operates as an SAS for managing secondary use, by a secondary system, of some or all of radio resources already used by a primary system, but is also capable of playing additional roles. It is to be noted that the communication control device 300 may be equipped with a function block other than those depicted in FIG. 19, according to the given roles.

Figure 20:
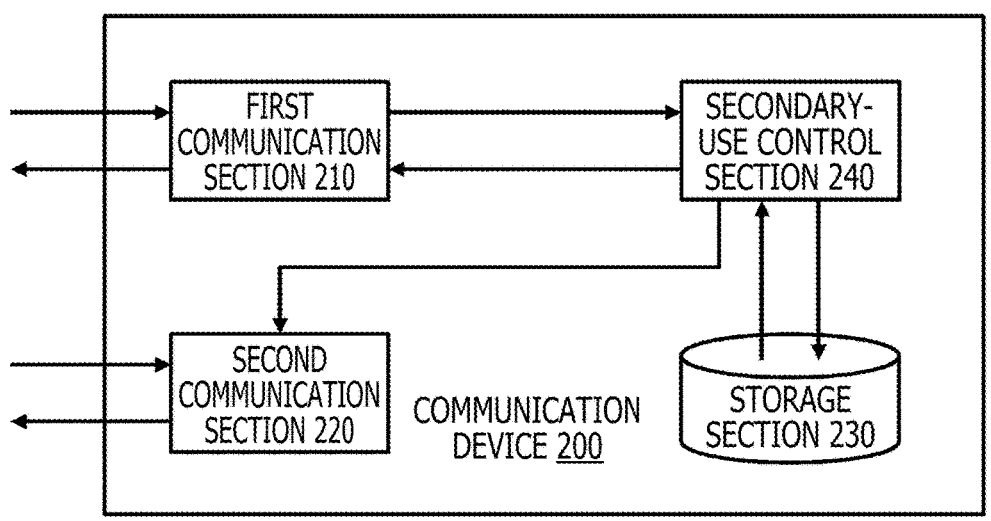
FIG. 20 is a block diagram depicting functional components of a communication device 200.

FIG. 20 schematically depicts the functional configuration of the communication device 200 that operates as a communication node of a secondary system. The communication device 200 secondarily uses some or all of frequencies being already used by a primary system, in accordance with determination made regarding permission/prohibition of use by the communication control device 300. The depicted communication device 200 includes a first communication section 210, a second communication section 220, a storage section 230, and a secondary-use control section 240. Each of the functional blocks is mounted through a software or hardware module.

The first communication section 210 is a communication interface for allowing the communication device 200 as a secondary use node to perform communication with the communication control device 300. The first communication section 210 transmits, to the communication control device 300, a secondary use registration request, an inquiry about available frequency information, a frequency use report (described later), etc., for example, and receives a response signal from the communication control device 300. The first communication section 210 is equipped with a Communication function of providing communication services requested to a communication protocol stack and an interface between logical functions and with a Com-SAP which is a service access point of the Communication function (see FIG. 9).

The second communication section 220 is a communication interface for providing secondary use communication services to a terminal device positioned in a service area (201a or 201b) of the communication device 200 by means of the communication device 200 serving as a secondary use node. For example, a wireless access method such as TDD-LTE, LBT-LTE, 5GNR, or IEEE 802.11 is supported by the second communication section 220. Information regarding the wireless access method supported by the second communication section 220 is previously stored in the storage section 230.

The storage section 230 includes a storage medium, such as a hard disk or a semiconductor memory, having a relatively large capacity. Information that is necessary for a secondary use registration request to the communication control device 300, information regarding a wireless access method supported by the second communication section 220, and the like, are previously stored in the storage section 230. In addition, when information regarding secondary use permission is provided from the communication control device 300 and received at the first communication section 210, the storage section 230 stores the information.

The secondary-use control section 240 controls a process for causing the communication device 200 serving as a secondary use node to secondarily use some or all of frequency bands already being used by the primary system and for providing secondary use communication services within the service area 201a or 201b via the second communication section 220. The secondary-use control section 240 uses, as appropriate, the information that is necessary for secondary use and is stored in the storage section 230. The secondary-use control section 240 is equipped with a Control function of transmitting auxiliary information to the communication control device 300 and controlling an operation as a secondary use node on the basis of the control result reported by the communication control device 300 and with a C-SAP which is a service access point of the Control function.

The communication device 200 operating as a communication node of the secondary system corresponds to a wireless base station, an access point, or a wireless relay station. However, it is to be noted that the communication device 200 may be equipped with a functional block other than those depicted in FIG. 20 according to the role.

In a case where, as a communication node of the secondary system, the communication device 200 secondarily uses some or all of frequencies already being used by the primary system, the communication device 200 can perform frequency use permitting procedures after executing secondary use registration to the communication control device 300 such as an SAS. It is to be noted that the communication device 200 may make an inquiry about available frequency information to the communication control device 300 before performing the frequency use permitting procedures. Further, when actually using a frequency permitted by the communication control device 300, the communication device 200 further performs frequency use reporting procedures with respect to the communication control device 300. Moreover, the communication control device 300 regularly executes synchronization of database record information with that in another communication control device.

Hereinafter, registration procedures, available frequency information inquiring procedures, frequency use permitting procedures, frequency use reporting procedures, and inter-database information synchronizing procedures will be explained in this order.

B-1. Registration Procedures

A communication node first executes communication control device registration procedures. For example, the "CBSD Registration Procedure" in the WINNF standard (see NPL 3), which has already been published, can be used.

Figure 21:
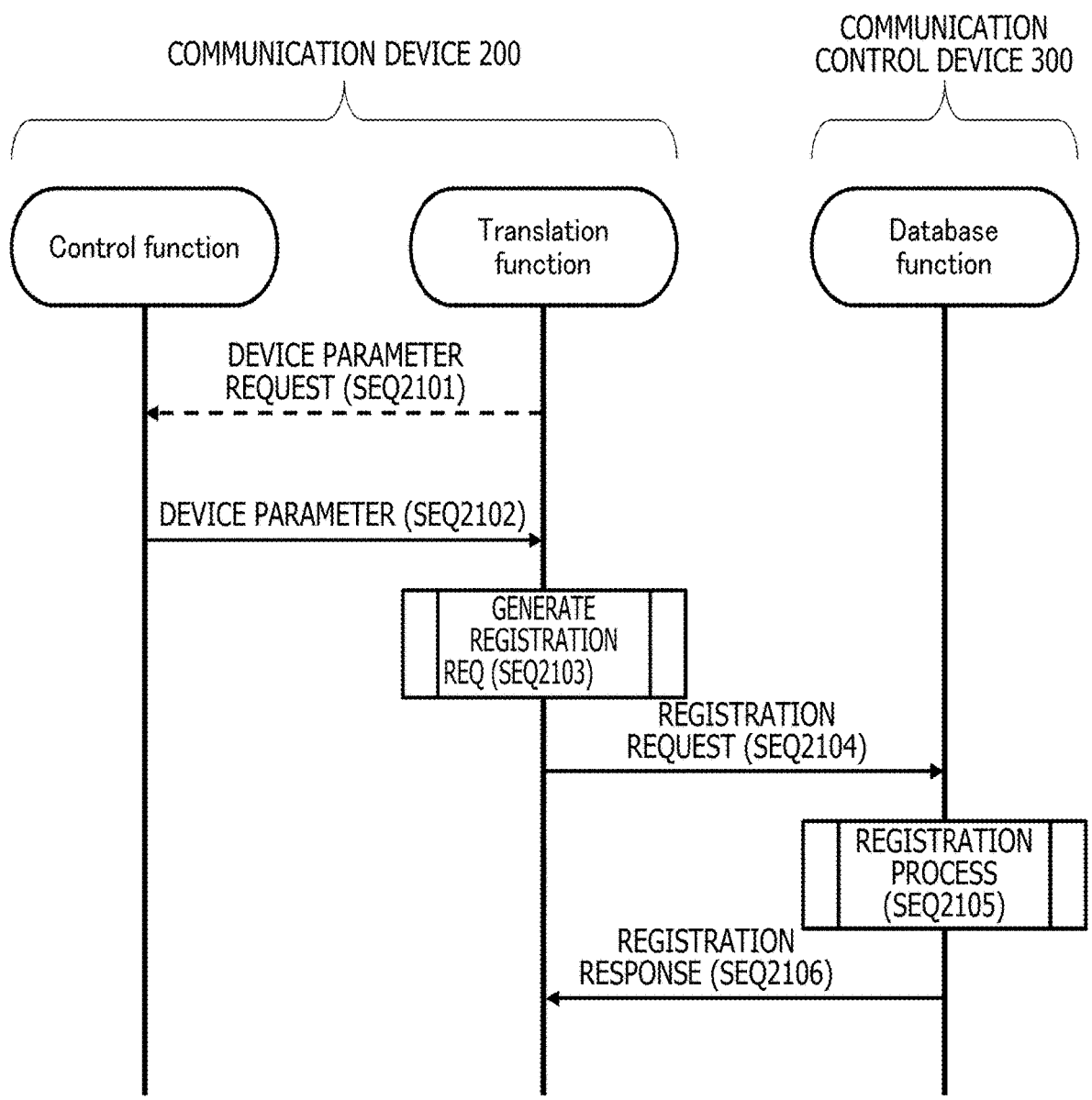
FIG. 21 is a diagram depicting a process sequence of secondary use node registration procedures.

FIG. 21 depicts a process sequence of secondary use node registration procedures in accordance with the system reference model (described previously). However, in FIG. 21, the processes of the Control function and the Translation function are executed in the communication device 200 which serves as a secondary use node, and the processes of the Database function are executed in the communication control device 300 which manages secondary use of radio resources being used by the primary system. Moreover, in FIG. 21, dotted-line arrows each indicate a process execution of which is optionally defined.

The Translation function acquires, from the Control function, a device parameter regarding a communication node that requests registration for secondary use (SEQ 2102). However, whether or not to transmit, from the Control function, a device parameter in response to the device parameter request (SEQ 2101) from the Translation function is optionally defined. The Translation function may acquire, from a plurality of the Control functions and/or a single Control function, information regarding a plurality of communication nodes, but such a process is not illustrated.

For the device parameter in this case, the following parameters (1) to (6) are assumed.
(1) Communication-node unique information (e.g. a serial number, production model information)
(2) Installation position information (e.g. the latitude, longitude, height, information regarding the accuracy of acquiring the positional information)
(3) Antenna information (e.g. the position, height, direction, beam pattern)
(4) Wireless interface information (e.g. an identifier indicating a radio wave standard, version information, duplex mode information)
(5) Public authentication information (e.g. a public authentication number/ID, the maximum EIRP, a supported frequency band)
(6) Provider information (e.g. a provider ID, a digital signature, contact information)

By using the device parameter acquired from the Control function, the Translation function generates a registration request (of a format that is recognizable to the communication control device 300) (SEQ 2103). In a case where the device parameter includes the provider information, processing for preventing any alternation of the registration request may be executed by use of the provider information during the registration request generation process. Further, information included in the registration request may be partially or entirely encrypted. Further, the provision position information may be written directly into the Database function by the provider, as disclosed in NPL 3.

Then, the registration request generated by the Translation function is reported to the Database function (SEQ 2105). In response to the request, the Database function having received the registration request registers the communication node which is the request source (SEQ 2105), and transmits a registration response according to the registration result (SEQ 2106).

B-2. Available Frequency Information Inquiring Procedures

After the above registration procedures are completed, the communication device 200 serving as the secondary use node may make an inquiry about available frequencies to the communication control device 300 at any timing. The inquiry about available frequencies can be typically made prior to the above registration procedures. The reason for this is that the later frequency available use permission procedures can be executed by the communication device 200 on the basis of information regarding the available frequencies acquired as a result of this inquiry. For the inquiring procedures for available frequency information, the "CBSD Spectrum Inquiry Procedure" (see NPL 3) of the WINNF standard, which has been already published, is used, for example.

Figure 22:
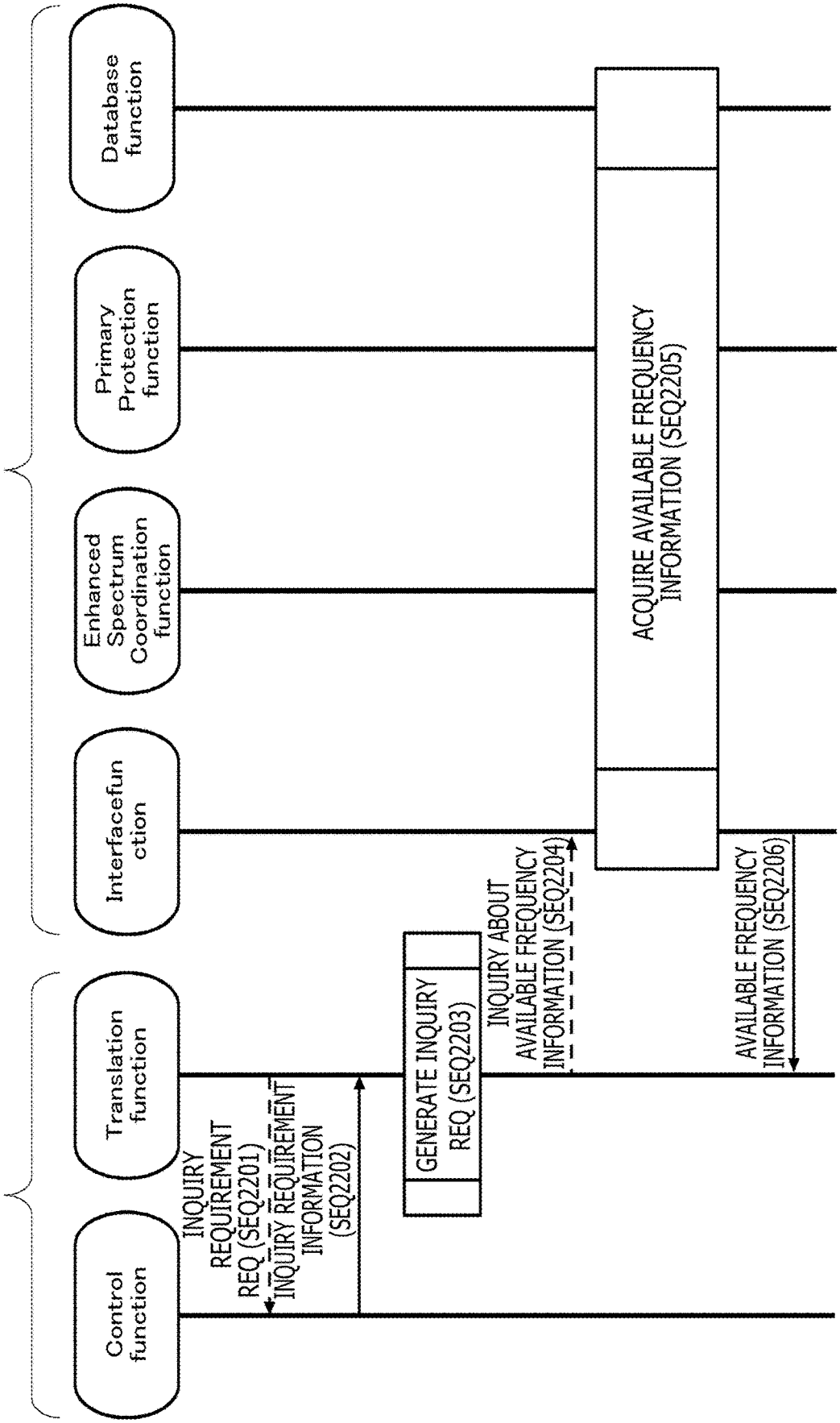
FIG. 22 is a diagram depicting a process sequence of available frequency information inquiring procedures.

FIG. 22 depicts a process sequence of the available frequency information inquiring procedures in accordance with the system reference model (described previously). The processes of the Control function and the Translation function in FIG. 22 are executed in the communication device 200 serving as a secondary use node, and the processes of the Database function, the Primary Protection function, the Enhanced Spectrum Coordination function, and the Interface function are executed in the communication control device 300 that manages secondary use of radio resources being used by the primary system. Also, in FIG. 22, dotted line arrows each indicate a process execution of which is optionally defined.

First, the Translation function acquires an inquiry requirement from the Control function (i.e., a secondary use node) (SEQ 2202). However, whether or not to cause the Control function to transmit a device parameter in response to an inquiry requirement request (SEQ 2201) from the Translation function is optionally defined. Here, the inquiry requirement can include, for example, information regarding a frequency band the availability of which is desired to be known.

On the basis of the inquiry requirement information acquired from the Control function, the Translation function generates an inquiry request (of a format that is recognizable to the communication control device 300) (SEQ 2203). Then, the Translation function reports the inquiry request to the Interface function (SEQ 2204).

The Interface function acquires an available frequency regarding the request-source secondary use node in cooperation with the Enhanced Spectrum Coordination function, the Primary Protection function, and/or the Database function (SEQ 2205). In cooperation with these functions, the Interface function acquires available frequency information in accordance with a prescribed spectrum policy regarding protection of a primary system and adjustment of frequency use. Details of this acquisition will be explained later (see C-2-2).

Then, the Interface function reports the acquired available frequency information to the Translation function of the request source (SEQ 2206).

B-3. Frequency Use Permitting Procedures

After the abovementioned registration procedures are completed, the communication device 200 serving as a secondary use node can execute frequency use permission procedures with respect to the communication control device 300. For the frequency use permission procedures, the "CBSD Grant Procedure" of the WINNF standard (see NPL 3), which has been already published, can be used, for example.

As the types of a frequency use permission request in the present embodiment, the following two types are assumed.

(1) Fixed Type

The communication device 200 designates a maximum transmission power and a frequency band use of which is desired by a secondary use node, and asks the communication control device 300 to permit an operation based on these communication parameters.

(2) Flexible Type

The communication device 200 designates only a requirement regarding a communication parameter. In this case, the communication control device 300 is configured to designate, as a requirement, a communication parameter for a communication node which is the request source, on the basis of the band width and the transmission power range, for example.

In NPL 3, the frequency use permission procedures corresponding to a frequency use permission request of the Fixed type are prescribed. It should be fully understood that, in the present embodiment, the frequency use permission procedures are executed in response to requests of both the Fixed type and the Flexible type.

Figure 23:
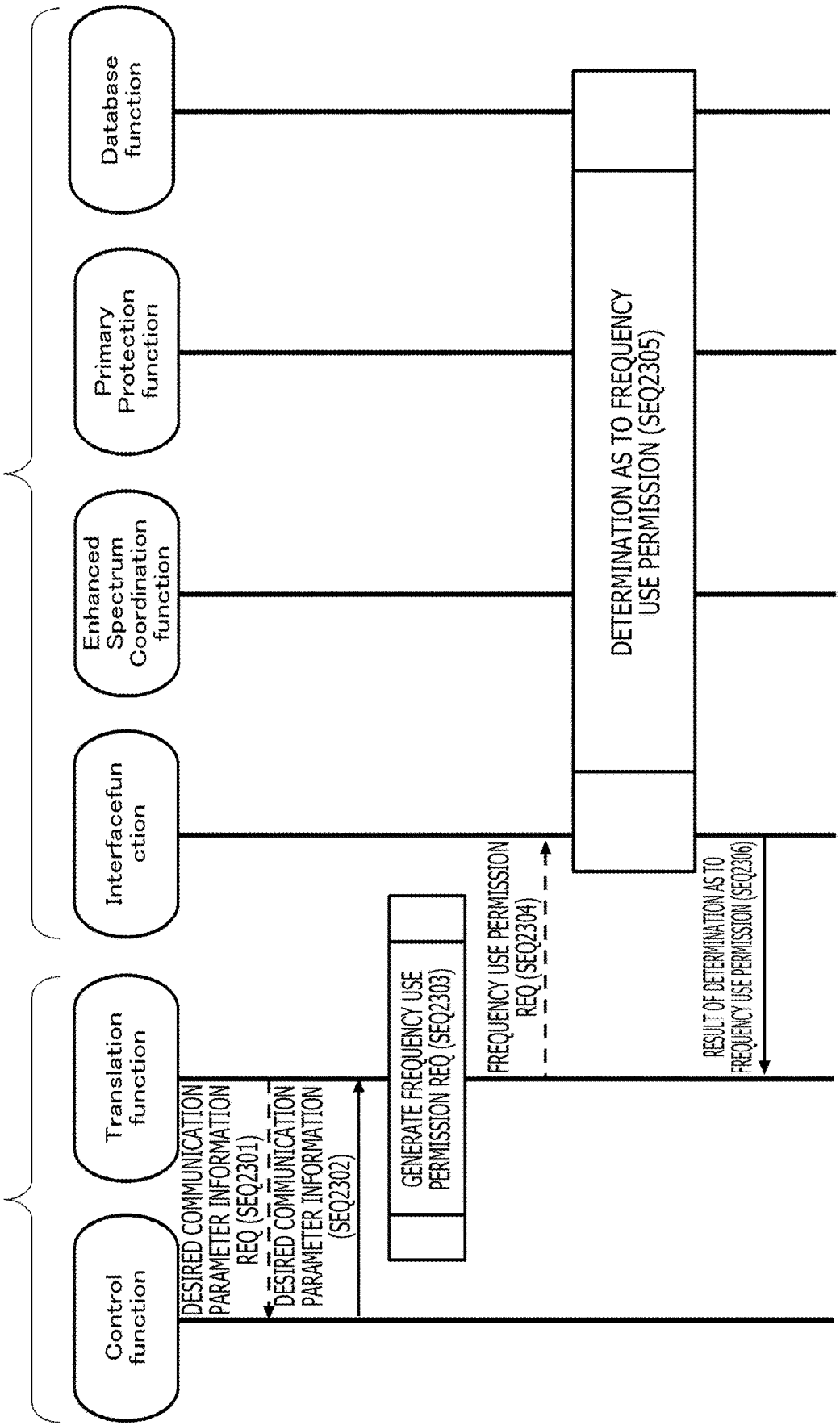
FIG. 23 is a diagram depicting a process sequence of frequency use permission procedures.

FIG. 23 depicts a process sequence of frequency use permission procedures in accordance with the system reference model (described previously). However, in FIG. 23, the processes of the Control function and the Translation function are executed in the communication device 200 which serves as a secondary use node, and the processes of the Database function, the Primary Protection function, the Enhanced Spectrum Coordination function, and the Interface function are executed in the communication control device 300 which manages secondary use of radio resources being used by the primary system. In addition, in FIG. 23, dotted-line arrows each indicate a process execution of which is optionally defined.

First, the Translation function acquires desired communication parameter information from the Control function (i.e. a secondary use node) (SEQ 2302). However, whether or not the Control function transmits a device parameter in response to the desired communication parameter request (SEQ 2301) from the Translation function is optionally defined. Here, for example, the desired communication parameter information includes, as auxiliary information for primary system protection calculation, parameters such as the request type (Fixed/Flexible), frequency information (Fixed), the maximum transmission power (Fixed), a desired bandwidth (Flexible), and a desired transmission power range (Flexible). In addition, as auxiliary information for inter-communication node interference control calculation, information such as an I/N (Interference to Noise power Ratio) and a desired SINR (Signal to Interference plus Noise power Ration) at a coverage end, for example, may be included in the desired communication parameter information.

The Translation function generates, on the basis of the desired communication parameter information acquired from the Control function, a frequency use permission request (of a format that is recognizable to the communication control device 300) (SEQ 2303). Then, the Translation function reports the frequency use permission request to the Interface function (SEQ 2304).

The Interface function makes a frequency use permission determination regarding the secondary use node which is the request source, in cooperation with the Enhanced Spectrum Coordination function, the Primary Protection function, and/or the Database function (SEQ 2305). In cooperation with these functions, the Interface function makes the frequency use permission determination in accordance with a prescribed spectrum policy regarding protection of a primary system and frequency use adjustment with respect to another communication node. Details of the determination will be explained later (see C-2-3).

Then, the Interface function reports the frequency use permission determination result to the Translation function of the request source (SEQ 2306). In a case where the frequency use permission request from the secondary use node is of the Fixed type, the frequency use permission determination result on the frequency band and the maximum transmission power as permission allowing communication parameters is reported. In addition, irrespective of the type of the frequency use permission request, the report on the frequency use permission determination result includes a frequency use permission ID. The frequency use permission ID is comparable to a Grant ID of the WINNF standard.

B-4. Frequency Use Reporting Procedures

After the frequency use permission procedures for the communication control device 300 are normally completed, the communication device 200 serving as a secondary use node further executes frequency use reporting procedures. It is desirable that the spectrum use reporting procedures be periodically executed until the frequency use permitted through the above frequency use permission procedures is rejected by the communication control device 300. For the frequency use reporting procedures, the "CBSD Heartbeat Procedure" (see NPL 3) of the WINNF standard, which has been already published can be used, for example.

Figure 24:
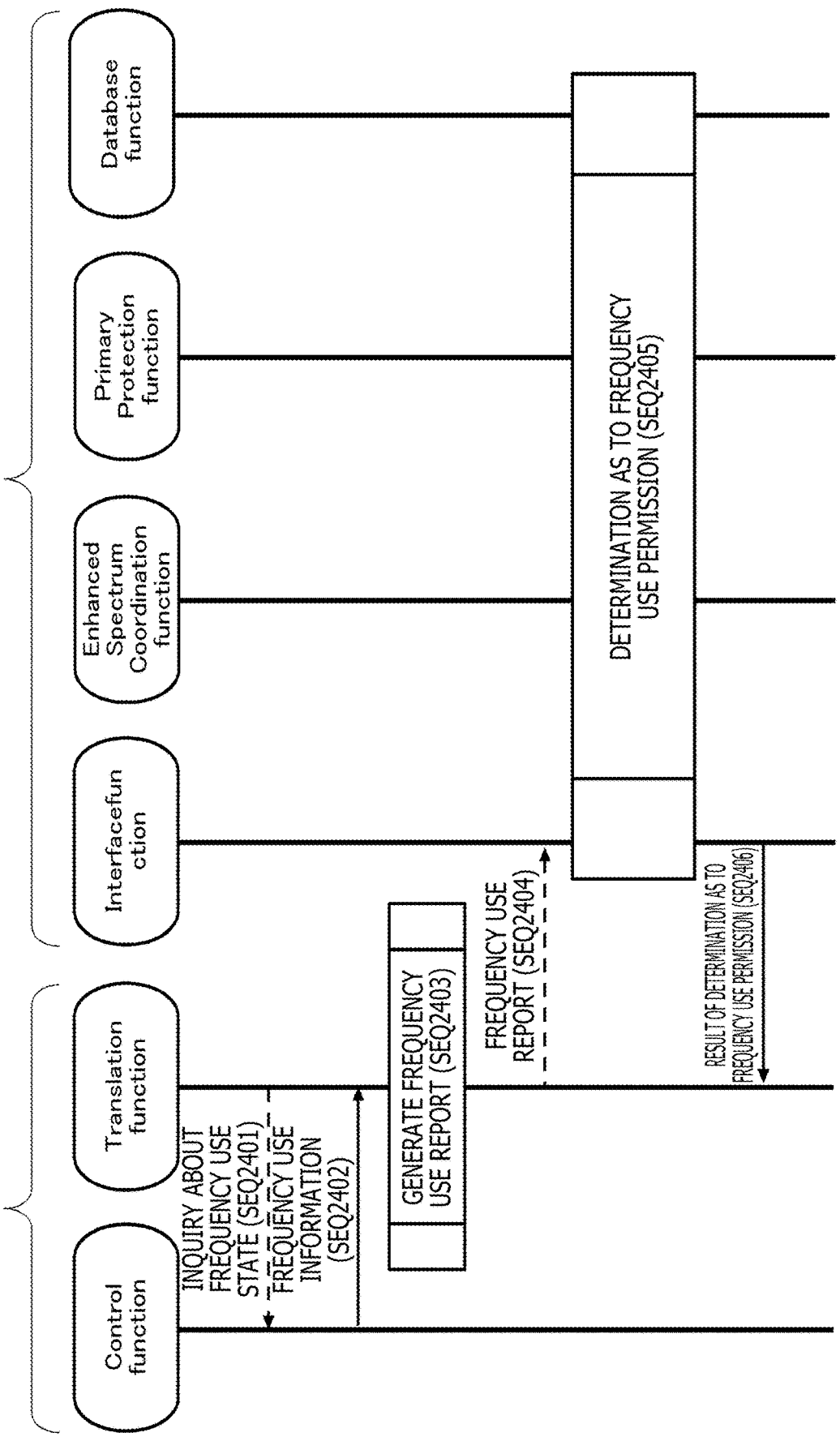
FIG. 24 is a diagram depicting a process sequence of a procedure of reporting frequency use.

FIG. 24 depicts a process sequence of the frequency use reporting procedures in accordance with the system reference model (described previously). However, in FIG. 24, the processes of the Control function and the Translation function are executed in the communication device 200 serving as a secondary use node, and the processes of the Database function, the Primary Protection function, the Enhanced Spectrum Coordination function, and the Interface function are executed in the communication control device 300 that manages secondary use of radio resources being used by the primary system. In addition, in FIG. 24, dotted-line arrows each indicate a process execution of which is optionally defined.

First, the Translation function acquires frequency use condition information from the Control function (i.e. secondary use node) (SEQ 2402). However, whether or not the Control function transmits a device parameter in response to the inquiry about the frequency use condition from the Translation function (SEQ 2401) is optionally defined.

The Translation function generates a frequency use report (of a format that is recognizable to the communication control device 300) on the basis of the frequency use condition information acquired from the Control function (SEQ 2403). The frequency use report can include at least the frequency use permission ID (described previously). Then, the Translation function reports the frequency use report to the Interface function (SEQ 2404).

The Interface function determines permission of frequency use regarding the secondary use node which is the request source in cooperation with the Enhanced Spectrum Coordination function, the Primary Protection function, and/or the Database function (SEQ 2405). In cooperation with these functions, the Interface function determines whether to permit frequency use at a time point of reception of the frequency use report, in accordance with a prescribed policy regarding protection of the primary system and adjustment of frequency use with respect to another communication node.

Then, the Interface function reports the frequency use permission determination result to the Translation function of the request source (SEQ 2406).

When the abovementioned spectrum use reporting procedures are normally completed and the frequency use is permitted by the communication control device 300, the communication device 200 serving as the secondary use node can start or continue radio transmission by using the radio resources the use of which has been permitted through the abovementioned frequency use permission procedures (see FIG. 23).

B-5. Inter-Database Information Synchronizing Procedures

The communication control device 300 regularly synchronizes recorded information in the recording section 320 with that in another communication control device. For example, NPL 2 discloses an operation policy to perform information exchange among plural SASs and execute calculation about protection of a primary system once in 24 hours (see NPL 2). Further, the "Full Activity Dump Exchange" (see NPL 4) of the WINNF standard can be used in the inter-database synchronizing procedures.

Figure 25:
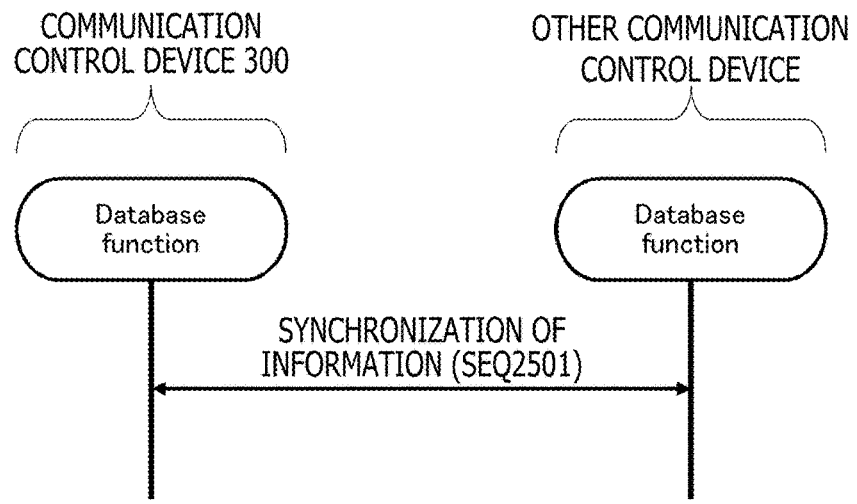
FIG. 25 is a diagram depicting a process sequence of inter-database information synchronizing procedures.

FIG. 25 depicts a process sequence of inter-database information synchronizing procedures in accordance with the system reference model (described previously). However, in FIG. 25, the processes of the Database function are executed in each of the communication control device 300 and another communication control device.

Inter-database information synchronization corresponds to exchange of recorded information between different Database functions. Synchronization of recorded information is regularly executed between the different Database functions (SEQ 2501).

In the inter-database information synchronizing procedures, it is desirable to exchange at least the following information.

(1) Communication node registration information
(2) Information regarding frequencies being used by a communication node
(3) Information regarding a protection area of a high-priority communication node The present embodiment is mainly characterized by further including inter-communication node interference control calculation as a process to be periodically executed in the communication control device. In the inter-communication node interference control calculation, on the basis of the influence of interference between communication nodes that, as a secondary system, each secondarily use some or all of radio resources already being used by a primary system, communication parameters for the secondary use communication nodes are determined.

C. Embodiments Concerning Spectrum Sharing

C-1. Representative Embodiment Concerning Spectrum Sharing

Figure 26:
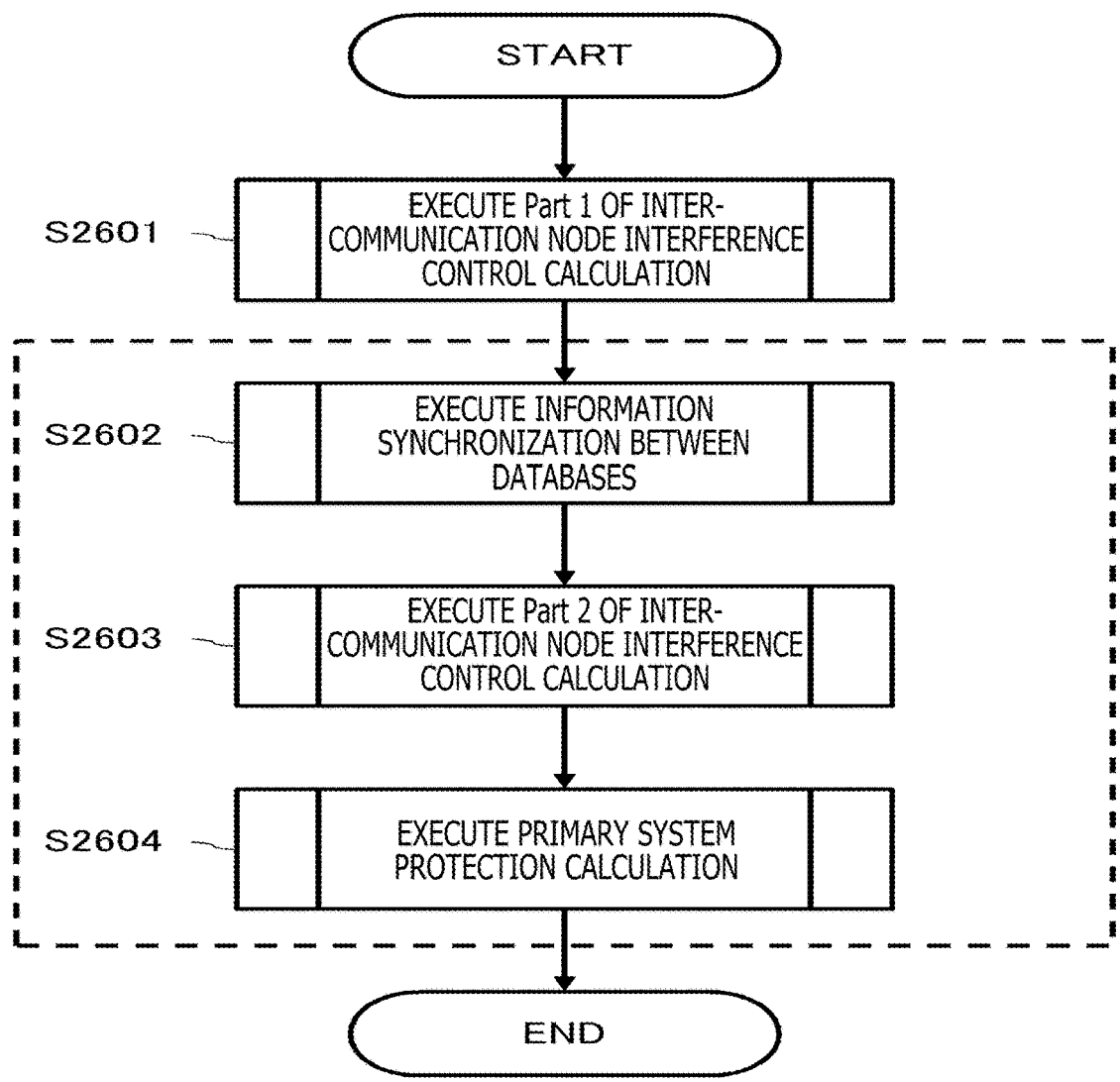
FIG. 26 is a flowchart depicting one example of a process procedure which an SAS periodically executes for spectrum sharing.
Figure 27:
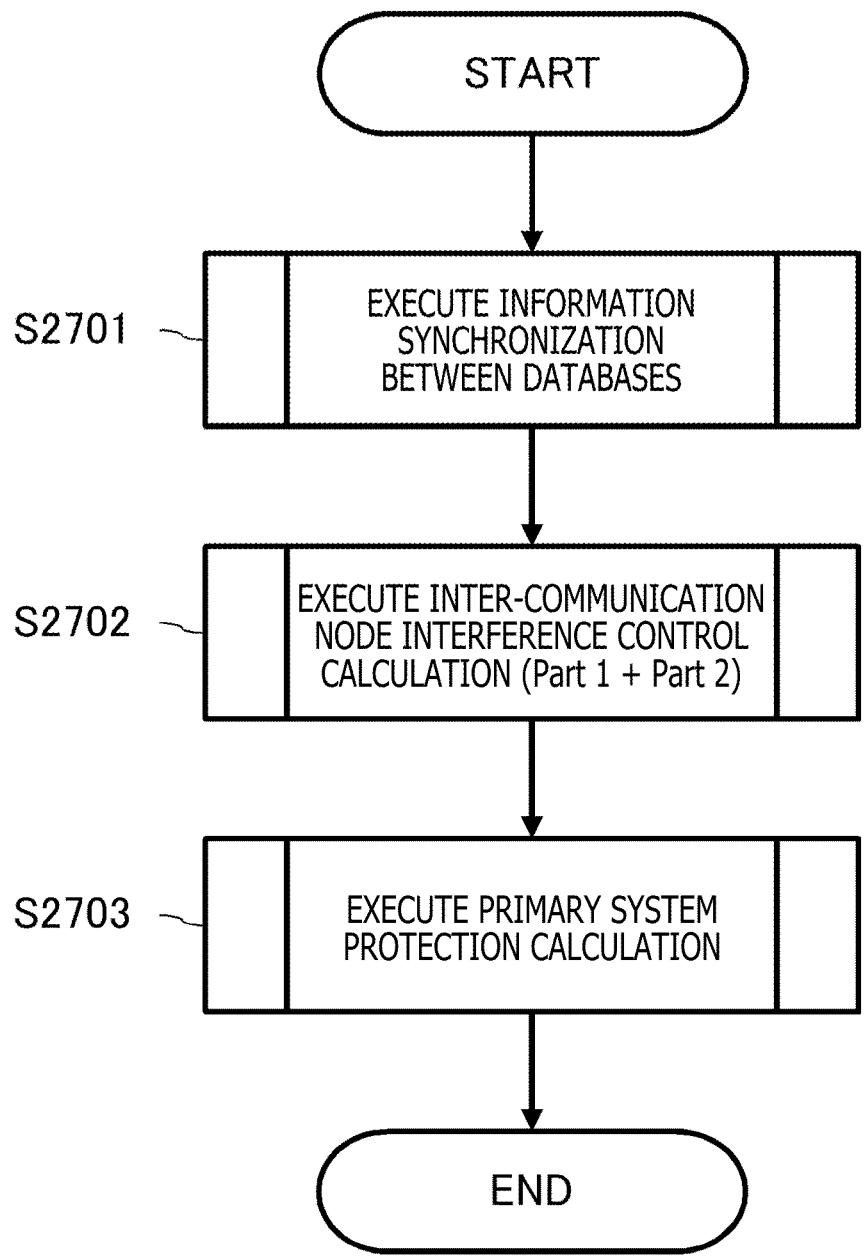
FIG. 27 is a flowchart depicting another example of a process procedure which an SAS periodically executes for spectrum sharing.

FIGS. 26 and 27 each depict a representative example, in a flowchart form, of processing procedures to be periodically executed for spectrum sharing by the communication control device 300. The processing procedures include inter-database information synchronization between the communication control device 300 and another communication control device, primary system protection calculation, and inter-communication node interference control calculation. Further, both the processes are characterized by executing inter-communication node interference control calculation prior to primary system protection calculation.

In accordance with the process procedures in FIG. 26 or 27, after adjusting the interference among plural communication nodes that each secondarily use a frequency band being used by a primary system, the communication control device 300 can satisfy a requirement for protection of the primary system. Meanwhile, when (at least a part of) the inter-communication node interference control calculation is executed after the primary-system protection calculation, there is a possibility that the requirement for protection of the primary system is not satisfied.

C-1-1. First Embodiment Related to Periodical Process

According to the process procedures depicted in FIG. 26, the communication control device first executes a part (indicated by "Part 1" in FIG. 26 for simplification) of the inter-communication node interference control calculation (step S2601). This process is executed by the Enhanced Spectrum Coordination function (see FIG. 5).

Part 1 of the inter-communication node interference control calculation may be executed, as appropriate, upon issuance of the registration request and/or the frequency use request from the communication node, for example. In this case, the communication control device 300 may refrain from permitting a communication node to perform radio transmission while giving a use permission to the communication node (for example, the communication control device 300 permits the communication node to use a frequency through the frequency use permitting procedures (see FIG. 23), but the communication node is unable to perform radio communication unless use of the frequency is permitted in response to the frequency use report from the communication node (see FIG. 24)). Alternatively, Part 1 of the inter-communication node interference control calculation may be, for example, executed immediately before the inter-database information synchronization which is periodically executed.

As a result of Part 1 of the inter-communication node interference control calculation, each communication control device specifically specifies the mutual interference relation among communication nodes being managed by the communication control device. As Part 1 of the inter-communication node interference control calculation, calculation of an Interference Graph indicating the interference relation between communication nodes is executed, by use of the graph theory, for example.

FIG. 28 depicts one example of the Interference Graph. In calculation of the Interference Graph, communication nodes are conceptually represented by Vertexes such that a process of connecting, by Edges, communication nodes that are considered to mutually interfere with each other is executed. Alternatively, similar information (see NPL 5) called Network Geometry Class which is described in the IEEE 802.19.1 standard, for example, may be calculated.

Figure 29:
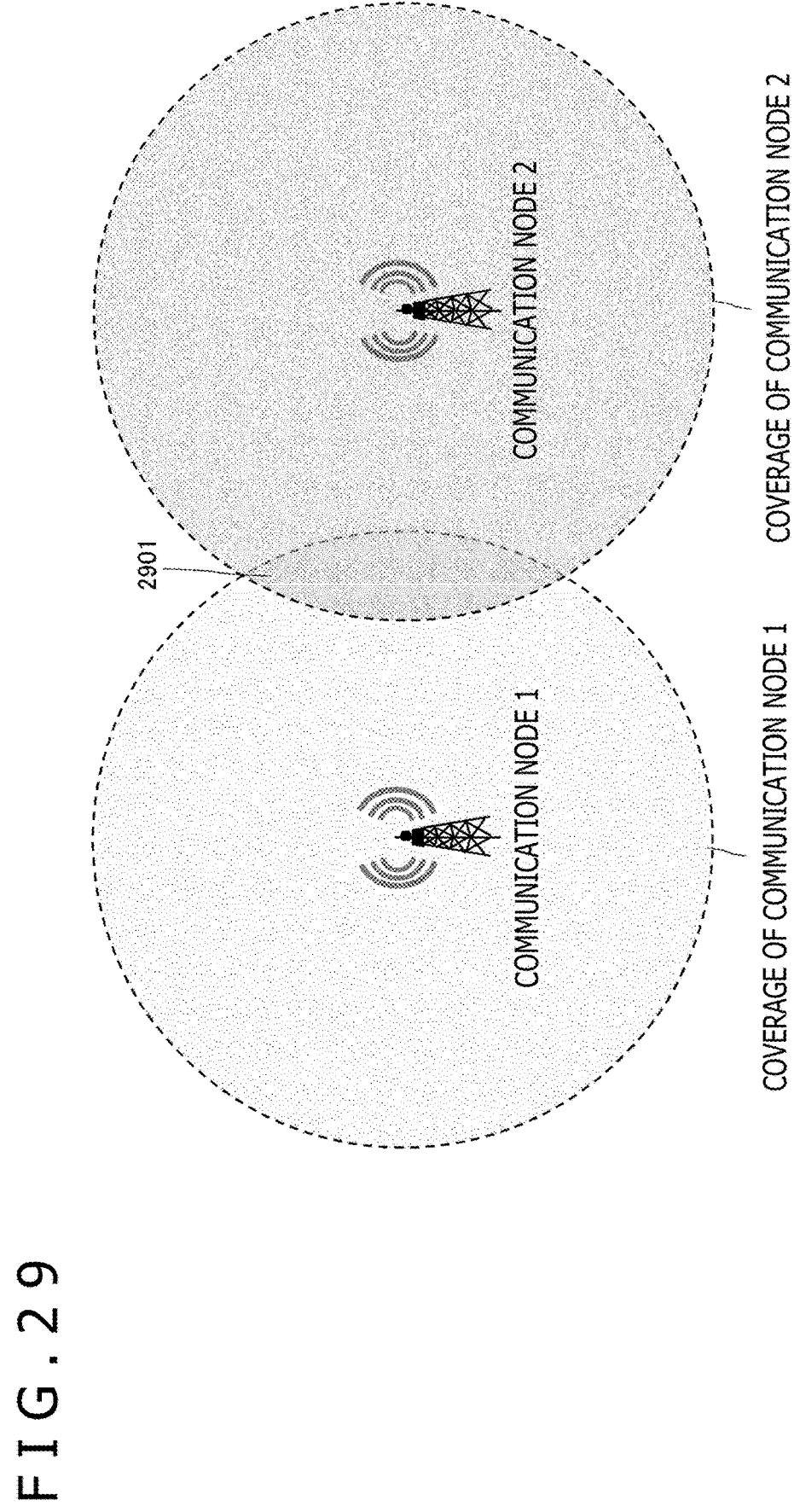
FIG. 29 is a diagram illustrating the coverage of a communication node 1 and the coverage of a communication node 2.

For a criterion for determining whether or not different communication nodes can mutually interfere with each other, coverage information regarding the communication nodes can be used, for example. For example, in a case where the coverages of different communication nodes partially (by a certain ratio or higher of the coverages) or entirely overlap each other, it can be determined that the communication nodes can mutually interfere so that the Vertexes are connected by an Edge. FIG. 29 illustrates the coverage of a communication node 1 and the coverage of a communication node 2. In the example depicted in FIG. 28, the coverage of the communication node 1 and the coverage of the communication node 2 overlap each other in a region denoted by reference numeral 2901.

Moreover, in a case where it is determined that interface can be mutually avoided by a technique unique to the Radio Access Technology (RAT) in view of information regarding the RAT, even if the respective coverages of communication nodes overlap, the Vertexes do not need to be connected via Edges.

Two other examples of a criterion or method for determining whether or not the coverages of communication nodes overlap each other are as follows.

(1) The coverages of communication nodes are divided into grids of a prescribed size. Then, in a case where the number of overlapping grids is greater than a prescribed number, coverage overlap is determined. For example, in a case where the coverages overlap but only a few grids overlap, these grids may be excluded. Regarding the expression "only a few," a grid occupying ratio may be designated.

(2) In a case where two different communication nodes wirelessly communicate with each other, it is considered that the coverages do not overlap each other.

Additional remarks are made to the latter determination criterion or determination method (2).

(2-1) The latter determination criterion is based on the assumption that, like wireless relay stations, communication nodes require wireless backhaul for the internet connection.

(2-2) The later processes include a process of allocating different frequency channels to the communication nodes having overlapping coverages. To perform communication between the communication nodes, communication between the communication nodes is impossible unless the same frequency channel is allocated to the communication nodes. In order to allocate the same frequency channel to the communication nodes, it is determined that the coverages do not overlap each other.

(2-3) In order to determine that the coverages of communication nodes that wirelessly communicate with each other do not overlap each other, information regarding an identifier indicating whether or not a communication node requires wireless backhaul for the internet connection as in a wireless relay station and/or an identifier indicating a serving communication node for such a communication node may be included in communication node registration information, for example. These identifiers can be used as auxiliary information to enable determination that the coverages do not overlap each other.

(2-4) The expression that two different communication nodes "wirelessly communicate with each other" can be reworded by "case where two different communication nodes wirelessly communicate with each other by TDD or Full Duplex communication" or "case where two different communication nodes do not execute transmission at the same time."

For communication control devices between which inter-database information synchronization is executed, it is desirable that the same criterion or method is used to make a determination regarding coverage overlap among communication nodes. If the communication control devices use different criterions or methods for making a determination regarding coverage overlap, discrepancies in, for example, Interference Graphs obtained by calculation performed for each of the communication control device are produced to hinder specification of the mutual interference relation between the communication nodes after execution of the inter-database information synchronization (for example, it is assumed that one of the communication control devices between which synchronization is performed determines that the coverage of the communication node 1 and the coverage of the communication node 2 overlap each other, while the other communication control device determines that the coverage of the communication node 1 and the coverage of the communication node 2 do not overlap each other, due to the difference in determination criterion).

In a case where different criteria or methods for making coverage overlapping determinations are used for communication control devices, it is desirable that the determination criteria or methods indicating the methods are shared by the communication control devices at the time of executing inter-database information synchronization. In addition, in order to reduce discrepancies between the communication control devices, it is desirable that coverages calculated by the communication control devices are shared in the later inter-database information synchronization.

In order to reduce a calculation amount, coverage calculation may be restricted to calculation of a particular frequency. For example, for the 3,550 to 3,700 MHz band, coverage calculation on only a 3,625 MHz which is the intermediate frequency may be performed. If a calculation amount does not matter, the coverages for all expected channels may be calculated and recorded such that the coverages can be used for the later processes.

The communication control device specifies the mutual interference relation between the communication nodes, and then, tentatively allocates different frequencies to the communication nodes having the mutual interference relation. This process is also executed by the Enhanced Spectrum Coordination function (see FIG. 5).

Here, the way to tentatively allocate frequencies depends on the type (that is, according to whether the request is the Fixed type or the Flexible type) of a frequency use permission request from a communication node.

For a communication node having issued a frequency use permission request of the Fixed type, the requested frequency and transmission power are set as tentative communication parameters.

For a communication node having issued a frequency use permission request of the Flexible type, a frequency different from that for a communication node connected via an Edge and a band satisfying the frequency width presented as a requirement are set as tentative communication parameters. The transmission power may be basically based on the device parameter (registered information), but, if a range thereof is specified as a requirement, the maximum transmission power falling within the range may be set as a tentative communication parameter.

The tentative allocation of frequencies is the last part of Part 1 of the inter-communication node interference control calculation in step S2601.

Next, the communication control device synchronizes inter-database information with another communication control device (step S2602). Synchronization of inter-database information is executed by the Database functions (see FIG. 2) of the respective communication control devices between which synchronization is executed. Here, in addition to the information (1) to (3) previously described in B-5, the following pieces of information (4) and (5) acquired through Part 1 of the inter-communication node interference control calculation executed in step S2601 are also shared by the communication control device.

(4) Information (Interference Graph, Network Geometry Class, etc.) indicating the mutual interference relation between communication nodes (5) Coverage information regarding communication nodes After executing the inter-database information synchronization, the communication control device executes the latter half (expressed by "Part 2" for simplification in FIG. 26) of the inter-communication node interference control calculation (step S2603). Similarly to step S2601, this step is executed by the Enhanced Spectrum Coordination function (see FIG. 5). At step S2603, the following calculation is executed.

Figure 30:
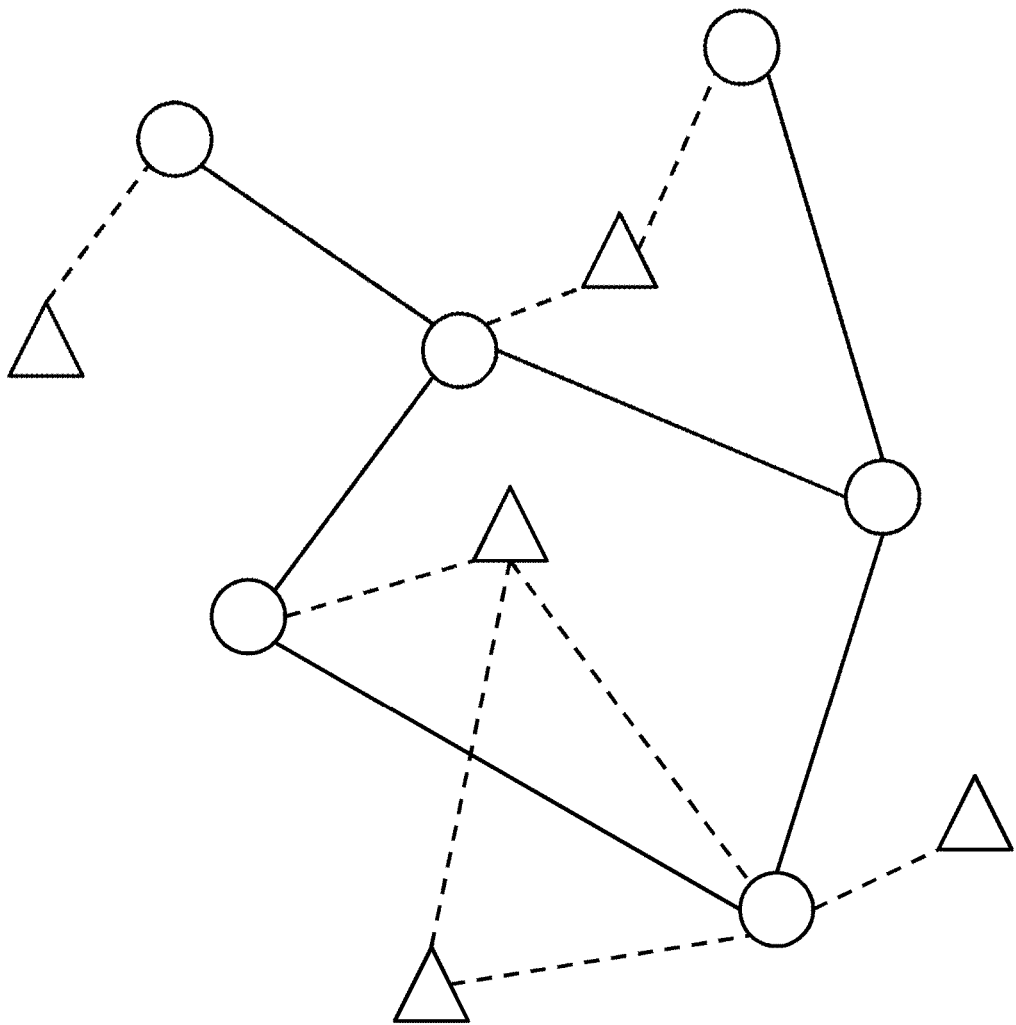
FIG. 30 is a diagram depicting one example of an Interference Graph indicating a mutual interference relation involving a communication node being managed by another communication control device.

(1) Specifying a mutual interference relation (Interference Graph, Network Geometry Class, etc.) involving communication nodes being managed by the other communication control device (2) Specifying to-be-allocated frequency candidates to the communication nodes on the basis of the result of specification of the mutual interference relation FIG. 30 depicts one example of the Interference Graph indicating a mutual interference relation involving communication nodes being managed by another communication control device. FIG. 30 depicts the graph obtained by superimposing, on the Interference Graph (see FIG. 28) indicating the mutual interference relation among communication nodes being managed by the communication control node 1, an Interference Graph including a mutual interference relation among communication nodes being managed by the communication control device 2 which is a synchronization partner.

To specify a mutual interference relation involving communication nodes being managed by the other communication control device, calculation may be executed again on the basis of information regarding all the communication nodes. However, as depicted in FIG. 30, it is desirable to, with respect to a mutual interference relation calculated before synchronization of inter-database information, calculate only an additional Edge generated by communication node information acquired from the other communication control device.

At step S2603, the Enhanced Spectrum Coordination function executes additional specification of to-be-allocated frequency candidates. Basically, tentative communication parameters are used in primary system protection calculation to be executed subsequently at step S2604. For the communication nodes being managed by the other communication control device, reference to communication parameter information associated with these communication nodes is made to be used in primary system protection calculation. Specification of to-be-allocated frequency candidates at step S2603 is executed in order to correct a tentative communication parameter that does not satisfy a primary system protection requirement obtained after the primary system protection calculation, and to report a recommended communication parameter. Specifically, specification of to-be-allocated frequency candidates is as follows.

(1) Regarding communication nodes which have a mutual interference relation with a communication node being managed by another communication control device and for which the same frequency is set as a tentative communication parameter, all candidates satisfying any one or all of the following conditions can be set.

(1-a) Maximum transmission power by which coverage overlap is prevented (or the overlapping area or a similar criterion becomes equal to or less than a prescribed value) in the same frequency (1-b) A frequency and maximum transmission power different from those for a communication node being managed by the other communication control device, and a frequency and maximum transmission power that do not seriously interfere with the remaining (adjacent) communication nodes being managed by the same communication control device (2) Regarding the remaining communication nodes, all candidates satisfying any one or all of the following conditions can be set.

(2-a) Maximum transmission power that has no serious influence on other (adjacent) communication nodes Subsequently, the communication control device executes primary system protection calculation (step S2604) by means of the Primary Protection function (see FIG. 3).

In the present embodiment, it is assumed that, in one example, the communication control device executes an interference margin allocation process (IAP) defined by the WINNF standard and calculation of a DPA (Dynamic Protection Area) MOVE List (see NPL 6) in the primary system protection calculation. Therefore, during implement, no limitation is imposed on them.

The communication control device allocates an interference amount (interference margin) that is allowable to the primary system, equally to the communication nodes through the IAP, and determines whether or not an estimated to-be-given interference amount which is calculated on the basis of a (tentative) communication parameter for each of the communication nodes exceeds the interference margin. NPL 6 discloses executing a determination process repeatedly by lowering the EIRP by 1 dB if such an amount is determined to exceed the interference margin.

In the Move List, communication nodes that can each give an intense interference to warship radars are registered. For example, if a frequency the use of which has been permitted in accordance with the process sequence depicted in FIG. 23 can give intense interference to a warship radar, a communication node for which use of this frequency has been permitted is registered in the Move List. Then, available frequency information for the primary system is updated in accordance with movement of the warship radar, for example, the communication nodes included in this list are prohibited from using radio waves (for example, even when a frequency use report is received from a communication node included in the Move List, any permission to use the frequency is not given).

In the primary system protection calculation, it is preferable that calculation of the IAP and calculation of the Move List may be executed in this order.

Here, when reporting a suspension of use of radio waves to a communication node included in the Move List, the communication control device reports the abovementioned allocated frequency candidate as a recommended communication parameter. Alternatively, in a case where any interference margin is not allocated to a certain communication node as a result of the IAP (or an interference margin allocating process which outputs the similar result), the communication control device also reports, to this communication node, the abovementioned to-be-allocated spectrum candidate as a communication parameter. However, the to-be-allocation spectrum candidate to be reported, also should satisfy the protection criterion for the primary system.

C-1-2. Second Embodiment Related to Periodical Process

According to the process procedures depicted in FIG. 27, each of communication control devices first executes inter-database information synchronization (step S2701). Inter-database information synchronization is executed by the Database function (see FIG. 2) of each of the communication control devices between which synchronization is executed. Here, the information (1) to (3) described previously in B-5 are shared by the communication control devices (information indicating the mutual interference relation between communication nodes or coverage information is not shared because Part 1 of the inter-communication node interference control calculation has not been executed).

Here, communication parameter information regarding a communication node already being operated can be shared by the databases, but communication parameter information regarding a communication node for which any official operation permission has not been given from the communication control device cannot be shared by the databases through synchronization. Therefore, it is desirable that, before inter-database information synchronization is executed at step S2701, the communication control devices execute a tentative spectrum allocating process to communication nodes, as in the process procedures in FIG. 26, such that tentative communication parameters are shared by the communication control devices.

Next, the communication control device executes inter-communication node control calculation (step S2702). At this step, calculation of the mutual interference relation between communication nodes in Part 1 of the inter-communication node control calculation and tentative allocation of frequencies to communication nodes and specification of to-be-allocated frequency candidates to the communication nodes in Part 2 of the inter-communication node control calculation are collectively executed.

Then, the communication control device executes primary system protection calculation by means of the Primary Protection function (see FIG. 3) (step S2703). In the primary system protection calculation, the communication control device executes the interference margin allocation process (IAP) and calculation of the MOVE List, for example, as in the process procedures in FIG. 26.

C-2. Application Example

Here, an explanation will be given of coverage calculation, acquisition of available frequency information, and determination to permit frequency use, which are related to the representative embodiment of spectrum sharing, explained previously in C-1.

C-2-1. Coverage Calculating Process

The communication control device calculates the coverage of a registered communication node by the Enhanced Spectrum Coordination function.

The coverage information may be included in a registration request to execute a communication node registering process. If so, it is preferable that coverage calculation is also executed by the Enhanced Spectrum Coordination function to inspect the appropriateness of the coverage information. In this case, the calculated result is reflected in a registration response to the communication node (for example, in a case where the coverage information is determined to be invalid, a report indicating the registration has been rejected is issued).

Hereinafter, only a case where coverage calculation is executed after a registration process will be explained for convenience.

Figure 31:
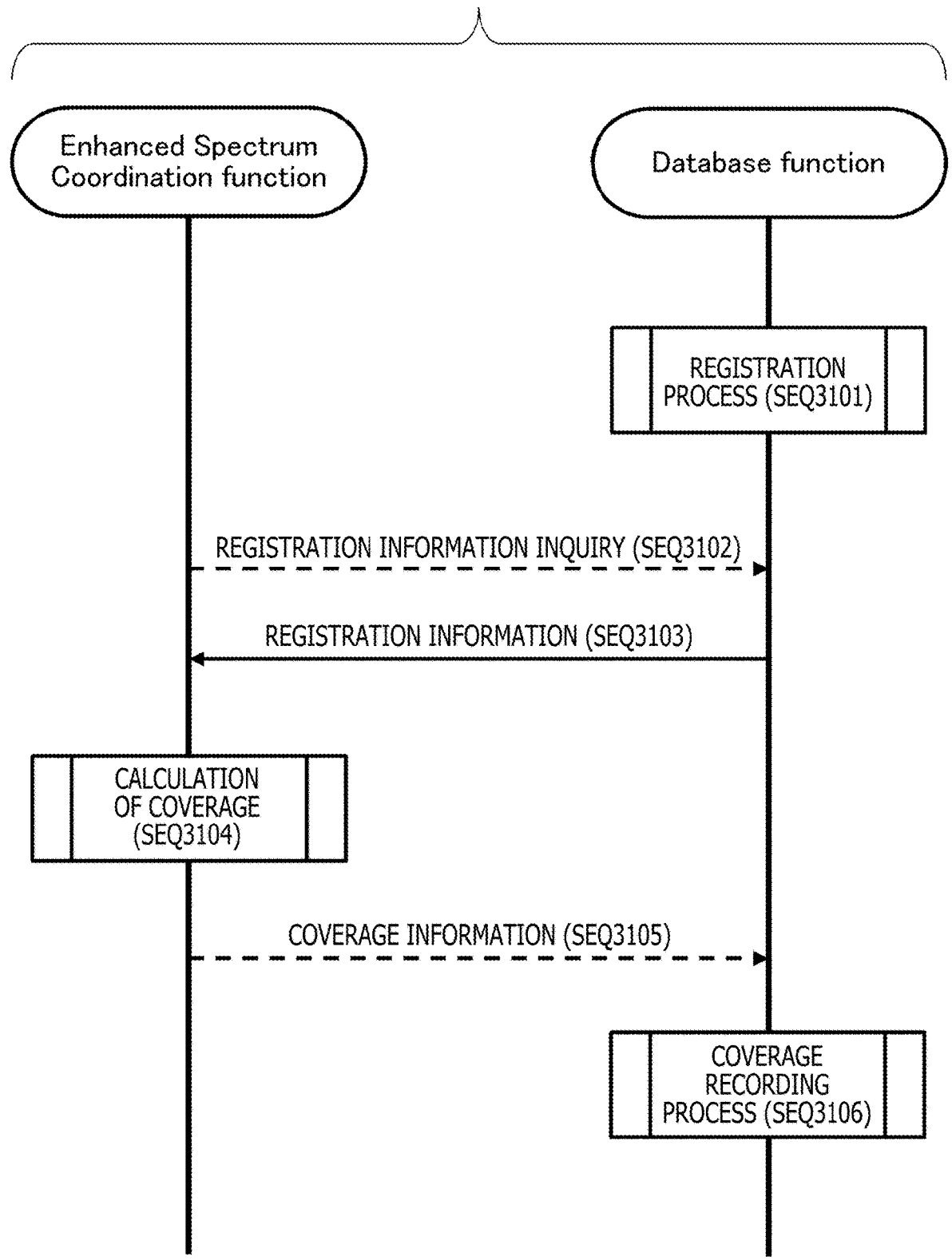
FIG. 31 is a diagram depicting a process sequence of coverage calculating procedures.

FIG. 31 depicts a process sequence of the coverage calculating procedures in accordance with the system reference model (described previously). However, in FIG. 31, the processes of both the Enhanced Spectrum Coordination function and the Database function are executed in the communication control device 300.

The Database function registers a communication node (not illustrated in FIG. 31) that secondarily uses a frequency band being used by a primary system (SEQ 3101). For the details of procedures for the communication control device 300 to register the communication node, see FIG. 21.

The Enhanced Spectrum Coordination function acquires information regarding the registered communication node from the Database function (SEQ 3103). However, whether or not the Database function transmits the registration information in response to a registration information inquiry from the Enhanced Spectrum Coordination function (SEQ 3102) is optionally defined.

Then, the Enhanced Spectrum Coordination function calculates the coverage of the communication node by using the registration information (SEQ 3104).

Whether or not the Enhanced Spectrum Coordination function is to report the coverage information obtained through the coverage calculation to the Database function is optionally defined (SEQ 3105).

The Database function records the coverage information reported from the Enhanced Spectrum Coordination function or the coverage information included in a registration request from the communication node (SEQ 3106).

As a result of the coverage calculation executed by the Enhanced Spectrum Coordination function, information regarding either (1) or (2) below can be obtained.

(1) The radius (about the communication node)
(2) A positional information set indicating the coverage outer shape To acquire the latter information, calculation may be executed by use of PPA Contour Methodology which is disclosed in NPL 6, for example. Here, in order to reduce the calculation amount, it is desirable that a spectrum frequency is designated for coverage calculation. For example, in CBRS, when the target band is the 3,550 to 3,700 MHz band, coverage calculation may be executed only on 3,625 MHz which is the intermediate frequency. If the calculation amount does not matter, the coverages of all expected channels may be calculated and recorded and may be used in the later processes.

Also, in CBRS, a PPA calculated by the PAL Channel Assignment functionality (see FIG. 4) of the Primary Protection function may be regarded as the coverage of a CBSD (i.e., a communication node) that is operated by PAL, and used in the later procedures.

C-2-2. Available Frequency Information Acquisition Process

Here, an explanation will be given of an available frequency information acquisition process which is executed in the communication control device 300 during the available frequency information inquiry procedures (see FIG. 22).

As a method for acquiring available frequency information, any one of (1) to (3) below can be used.

(1) Executing calculation preliminarily and acquiring recorded information
(2) Calculating information regarding a currently recommended available frequency by using information obtained by preliminary calculation
(3) Calculating information regarding a currently recommended available frequency on the basis of the latest information at an inquiry arrival time The method (1) described above can be adopted in a case where information is exchanged among a plurality of communication control devices and primary system protection calculation is executed once in 24 hours, as in CPAS (Coordinated Periodic Activities SASs) disclosed in NPL 2. In a case where inter-communication node interference control calculation is also executed in calculation which is regularly executed in CPAS, for example, the method (1) described above can be adopted.

The method (2) described above can be adopted in a case where, for example, primary system protection calculation is executed once in 24 hours and inter-communication node interference calculation is dynamically executed. Alternatively, the method (2) described above can be also adopted in a case where both primary system protection calculation and inter-communication node interference control calculation are regularly executed but available frequency information that is recommended at a request time point is provided to a new communication node (New entrant, a communication node operation of which is to be started).

The method (3) described above can be adopted in a case where all calculations including primary system protection calculation and inter-communication node interference control calculation, etc. are dynamically executed.

Which one of the methods (1) to (3) is adopted may be uniquely determined by mounting of the Database function. However, a request regarding the method for acquiring available frequency information may be reported by the Translation function (communication node-side).

In a case where the method (2) or (3) is adopted, the communication parameter calculation method explained previously in C-1 can be adopted. For example, a communication parameter specified as an available frequency candidate is provided as available frequency information.

C-2-3. Frequency Use Permission Determination Process

Here, an explanation will be given of an available frequency information acquisition process which is executed in the communication control device 300 during the frequency use permitting procedures (see FIG. 23).

To determine permission for frequency use, determination to permit a communication parameter in response to a request of the Fixed type or determination to permit an allowable communication parameter in response to a request of the Flexible type is made on the basis of at least the result of primary system protection calculation.

The communication parameter calculation method, which has been previously explained in C-1, can be also adopted in the frequency use permission determination process, as in the available frequency information acquiring process.

In a case where the request for permission of a communication parameter is the Fixed type, when tentative communication parameters set by inter-communication node interference calculation are determined to have failed to satisfy a protection criterion for the primary system, a frequency, among to-be-allocated frequency candidates set by the inter-communication node interference calculation, satisfying the protection criterion for the primary system may be provided as a recommended parameter to the request source communication node.

In a case where the request for permission of a communication parameter is the Flexible type, when tentative communication parameters set by inter-communication node interference calculation are determined to have failed to satisfy the protection criterion for the primary system, either the corrected tentative communication parameters (for which correction is made within the range satisfying the requirement) or a frequency, among the to-be-allocated frequency candidates set by the inter-communication node interference calculation, satisfying the protection criterion for the primary system may be provided as a permission parameter to the request source communication node.

In a case where the frequency use permission determining process is executed, for example, at a timing immediately before information sharing among databases, a requested communication parameter (Flexible type) may tentatively permitted. In a case where a Flexible type request for permission of frequency use is made, a communication parameter that is obtained by considering only primary system protection calculation may be tentatively permitted. The tentatively permitted communication parameter is used to calculate a mutual interference relation during information sharing among databases.

As a result of being pursuant to the process procedures explained previously in C, the communication control device can, as a server monitoring radio waves of communication nodes secondarily using a frequency band being used by a primary system, have an inter-communication node interference control function effectively, for example.

INDUSTRIAL APPLICABILITY

The technique disclosed herein has been explained above in detail with reference to the particular embodiments. However, it is obvious that a person skilled in the art can make modification or substitution on the embodiments within the gist of the technique disclosed herein.

The present specification has mainly given the explanations of the embodiments in which the technique disclosed herein is applied to use of CBRS in the 3.5 GHz band for which the FCC has legislated. However, the gist of the technique disclosed herein is not limited to these embodiments. Even when any wireless systems other than those explained in the abovementioned embodiments are used as a primary system and a secondary system, or even when a frequency band other than the 3.5 Hz band is shared by plural wireless systems, the technique disclosed herein can be used in the same manner.

In addition, the application scope of the technique disclosed herein is not restricted by spectrum sharing environments. In spectrum sharing, an incumbent system using a target band and a secondary user are usually called primary system and secondary system, respectively. However, in a case where the technique disclosed herein is applied to an environment other than spectrum sharing environments, these terms may be replaced with other terms.

For example, a macro cell and a small cell or relay station in HetNet (Heterogeneous Network) are defined as a primary system and a secondary system, respectively, and the technique disclosed herein is applied thereto. Accordingly, coexistence of wireless systems can be preferably implemented.

Further, when a base station and a Relay UE or Vehicle UE being present in the coverage of the base station to implement D2D or V2X (Vehicle to Everything) are defined as a primary system and a secondary system, respectively, the technique disclosed herein is applied thereto. Accordingly, coexistence of wireless systems can be preferably implemented. In this case, the base station is not limited to a fixed type and may be a portable type or mobile type.

Moreover, an interface between the entities may be wired or may be wireless. For example, a wireless interface (e.g. a wireless interface that is provided via a Licensed band by a mobile communication provider or Wi-Fi communication using an incumbent band that does not require any license) that does not depend on spectrum sharing may be used as an interface between a communication control device managing secondary use of radio resources and a communication device that makes a request for radio resources.

That is, the technique disclosed herein has been explained in a form of exemplifications, and thus, the disclosure in the present specification should not be limitedly interpreted. In order to assess the gist of the technique disclosed herein, the claims should be considered.

It is to be noted that the technique disclosed herein also may have the following configurations.

(1)

A communication control device for managing a second wireless system that secondarily uses some or all of frequencies being used by a first wireless system, the communication control device including:

an acquisition section that acquires, from the second wireless system, desired communication parameter information regarding secondary use;

a setting section that sets a tentative communication parameter for the second wireless system on the basis of the desired communication parameter information;

a determination section that determines, by using a protection criterion for the first wireless system, whether or not the tentative communication parameter set by the setting section satisfies a prescribed requirement regarding the first wireless system; and a reporting section that, in a case where the determination section determines that the prescribed requirement is satisfied, reports a permission communication parameter based on the tentative communication parameter to the second wireless system.

(2)

The communication control device according to (1), in which the acquisition section acquires the desired communication parameter information that is based on either a first type to include information regarding a maximum transmission power and a frequency that are desired by the second wireless system or a second type to include a requirement regarding a communication parameter for the second wireless system.

(3)

The communication control device according to (2), in which the requirement regarding the communication parameter for the second wireless system includes at least one of a bandwidth or a transmission power range.

(4)

The communication control device according to (2) or (3), in which in a case where the acquisition section acquires the desired communication parameter based on the first type, the setting section sets, as tentative communication parameters for the second wireless system, maximum transmission power and frequency indicated by the desired communication parameter information.

(5)

The communication control device according to any one of (2) to (4), in which in a case where the acquisition section acquires the desired communication parameter based on the second type, the setting section sets a tentative communication parameter for the second wireless system while considering the desired communication parameter information and mutual interference with one or more other second wireless systems.

(6)

The communication control device according to any one of (1) to (5), in which the reporting section further reports the tentative communication parameter for the second wireless system set by the setting section, to another communication control device.

(7)

The communication control device according to any one of (1) to (6), in which the setting section further sets coverage information regarding the second wireless system, and the reporting section further reports the coverage information to another communication control device.

(7-1)

The communication control device according to (7), in which setting is performed such that the coverages of two or more second wireless systems that are wirelessly communicating with each other do not overlap each other.

(7-2)

The communication control device according to (7-1), in which setting is performed such that the coverages do not overlap each other on the basis of registration information regarding the two or more second wireless systems.

(7-3)

The communication control device according to (7-2), in which setting is performed such that the coverages do not overlap each other if the second wireless systems include CPE CBSDs.

(7-4)

The communication control device according to (7-1), in which the setting section performs setting such that coverages of two or more second wireless systems that are wirelessly communicating with each other by time-division communication or by full duplex communication do not overlap each other.

(8)

The communication control device according to any one of (1) to (7), in which the acquisition section further acquires, from another communication control device, information regarding a tentative communication parameter regarding a second wireless system being managed by the other communication control device, and by using information regarding the tentative communication parameter acquired by the acquisition section and information regarding the protection criterion for the first wireless system, the determination section determines whether or not the tentative communication parameter set by the setting section satisfies the prescribed requirement regarding the first wireless system.

(9)

The communication control device according to any one of (1) to (8), in which the acquisition section further acquires, from another communication control device, information regarding a tentative communication parameter for the second wireless system being managed by the other communication control device, and by using information regarding the tentative communication parameter acquired by the acquisition section, the determination section determines a mutual interference relation with respect to the second wireless system being managed by the communication control device itself.

(10)

The communication control device according to any one of (2) to (5), in which the setting section sets plural tentative communication parameter candidates that are expected to be permitted by the second wireless system.

(11)

The communication control device according to (10), in which in a case where the determination section determines that a tentative communication parameter set on the basis of the desired communication parameter based on the first type does not satisfy the prescribed requirement regarding the first wireless system, the setting section sets, as a recommended parameter, a communication parameter that satisfies the prescribed requirement from among the plural tentative communication parameter candidates set by the setting section, and the reporting section reports the recommended parameter to the second wireless system.

(12)

The communication control device according to (10) or (11), in which in a case where the determination section determines that a tentative communication parameter set on the basis of the desired communication parameter information based on the second type does not satisfy the prescribed requirement regarding the first wireless system, the setting section sets a permission communication parameter by correcting the tentative communication parameter or by selecting a communication parameter that satisfies the prescribed requirement from among the plural tentative communication parameter candidates set by the setting section, and the reporting section reports the permission communication parameter to the second wireless system.

(13)

A communication control method for managing a second wireless system that secondarily uses some or all of frequencies being used by a first wireless system, the communication control method including:

an acquisition step of acquiring, from the second wireless system, desired communication parameter information regarding secondary use based on a first type or a second type;

a setting step of setting a tentative communication parameter for the second wireless system on the basis of the desired communication parameter information;

a determination step of determining, by using a protection criterion for the first wireless system, whether or not the tentative communication parameter set at the setting step satisfies a prescribed requirement regarding the first wireless system; and a reporting step of, in a case where satisfaction of the prescribed requirement is determined at the determination step, reporting the tentative communication parameter to the second wireless system.

REFERENCE SINGS LIST

100 . . . Communication system
110 . . . Communication node (Primary use node)
200a, 200b . . . Communication node (Secondary use node)
210 . . . First communication section, 220 . . . Second communication section
230 . . . Storage section, 240 . . . Secondary use control section
300 . . . Communication control section
310 . . . Communication section, 320 . . . Storage section, 330 . . . Estimation section, 340 . . . Control section

The invention claimed is:

1. A communication control device for managing a second wireless system that desires to secondarily use at least one frequency being used by a first wireless system different from the second wireless system, the at least one frequency being in the 3.5 GHz band, the communication control device comprising:

a transceiver that transceives data; and
control circuitry operatively connected to the transceiver and that
acquires, from the second wireless system, desired communication parameter information regarding secondary use, by the second wireless system, of the at least one frequency in the 3.5 GHz band being used by the first wireless system;
determines whether the desired communication parameter information is either:
a desired fixed communication parameter to include information regarding each of a maximum transmission power and a frequency in the 3.5 GHz band assigned to the first wireless system that are desired by the second wireless system, or a desired flexible communication parameter to include a requirement regarding each of a bandwidth and a transmission power range in the 3.5 GHz band assigned to the first wireless system that are desired by the second wireless system;

sets at least one tentative communication parameter for the second wireless system on a basis of the determined desired communication parameter information;

determines, by using a protection criterion for the first wireless system, whether or not the that the at least one tentative communication parameter satisfies a prescribed requirement regarding the first wireless system, wherein the control circuitry determines that the at least one tentative communication parameter satisfies the prescribed requirement by:

in a case where the desired communication parameter is determined to be the desired fixed communication parameter, performing a fixed parameter Primary Protection function to determine that the desired maximum transmission power and the desired frequency in the 3.5 GHz band may be used by the second wireless system without hindering radio-wave use by the first wireless system, and in a case where the desired communication parameter is determined to be the desired flexible communication parameter, performing a flexible parameter Primary Protection function to determine that the desired bandwidth and the desired transmission power range in the 3.5 GHz band may be used by the second wireless system without hindering radio-wave use by the first wireless system, followed by an Enhanced Spectrum Coordination function of adjusting at least one frequency in the desired bandwidth and at least one maximum allowable transmission power in the desired transmission power range to reduce or avoid interference in the 3.5 GHz band between communication nodes of the second wireless system; and reports a permission communication parameter based on the tentative communication parameter to the second wireless system.

2. A communication control method for managing a second wireless system that desires to secondarily use at least one frequency being used by a first wireless system different from the second wireless system, the at least one frequency being in the 3.5 GHz band, the communication control method performed by a communication device and comprising:

acquiring, by the communication device from the second wireless system, desired communication parameter information regarding secondary use, by the second wireless system, of the at least one frequency in the 3.5 GHz band being used by the first wireless system;

determining by the communication device whether the desired communication parameter information is either:

a desired fixed communication parameter to include information regarding each of a maximum transmission power and a frequency in the 3.5 GHz band assigned to the first wireless system that are desired by the second wireless system, or a desired flexible communication parameter to include a requirement regarding each of a bandwidth and a transmission power range in the 3.5 GHz band assigned to the first wireless system that are desired by the second wireless system;

setting by the communication device at least one tentative communication parameter for the second wireless system on a basis of the determined desired communication parameter information;

determining, by the communication device by using a protection criterion for the first wireless system, that the at least one tentative communication parameter satisfies a prescribed requirement regarding the first wireless system, wherein the determining by the communication device that the at least one tentative communication parameter satisfies the prescribed requirement comprises:

in a case where the desired communication parameter is determined by the communication device to be the desired fixed communication parameter, performing a fixed parameter Primary Protection function to determine that the desired maximum transmission power and the desired frequency in the 3.5 GHz band may be used by the second wireless system without hindering radio-wave use by the first wireless system, and in a case where the desired communication parameter is determined by the communication device to be the desired flexible communication parameter, performing a flexible parameter Primary Protection function to determine that the desired bandwidth and the desired transmission power range in the 3.5 GHz band may be used by the second wireless system without hindering radio-wave use by the first wireless system, followed by an Enhanced Spectrum Coordination function of adjusting at least one frequency in the desired bandwidth and at least one maximum allowable transmission power in the desired transmission power range to reduce or avoid interference in the 3.5 GHz band between communication nodes of the second wireless system; and reporting a permission communication parameter based on the tentative communication parameter by the communication device to the second wireless system.

* * * * *